(12) United States Patent
Davis et al.

(10) Patent No.: US 8,602,713 B1
(45) Date of Patent: Dec. 10, 2013

(54) UNIVERSAL AIRCRAFT MULE

(75) Inventors: Lawrence B. Davis, Andover, MN (US); Karl Steven Schmoeckel, Stillwater, MN (US)

(73) Assignee: International Automated Systems, Inc., Blaine, MN (US)

( * ) Notice: Subject to any disclaimer, the term of this patent is extended or adjusted under 35 U.S.C. 154(b) by 279 days.

(21) Appl. No.: 12/789,870

(22) Filed: May 28, 2010

(51) Int. Cl.
*B60P 1/34* (2006.01)

(52) U.S. Cl.
USPC ........... 414/589; 414/471; 254/3 C; 254/10 C

(58) Field of Classification Search
USPC ......... 414/471, 589; 254/3 R, 3 C, 8 C, 10 R, 254/10 C
See application file for complete search history.

(56) References Cited

U.S. PATENT DOCUMENTS

| | | | | |
|---|---|---|---|---|
| 2,712,874 A | * | 7/1955 | Murray | 414/743 |
| 2,785,807 A | * | 3/1957 | Prowinsky | 414/589 |
| 2,896,909 A | * | 7/1959 | Taylor | 254/9 R |
| 2,920,773 A | * | 1/1960 | Knabe | 414/743 |
| 2,922,533 A | * | 1/1960 | La Barge, Jr. | 414/746.7 |
| 2,931,519 A | * | 4/1960 | Beach | 414/589 |
| 2,974,972 A | * | 3/1961 | Hassell | 280/43.23 |
| 2,994,443 A | * | 8/1961 | Gordon | 414/728 |
| 3,220,585 A | * | 11/1965 | McCartney et al. | 414/659 |
| 3,259,255 A | * | 7/1966 | Cresci et al. | 414/590 |
| 3,319,932 A | * | 5/1967 | Szczepanik | 254/9 C |
| 4,412,774 A | * | 11/1983 | Legrand et al. | 414/589 |
| 4,461,455 A | * | 7/1984 | Mills et al. | 254/3 R |
| 4,522,548 A | * | 6/1985 | Oswald et al. | 414/458 |
| 4,526,344 A | * | 7/1985 | Oswald et al. | 254/9 C |
| 4,907,935 A | * | 3/1990 | Mankey | 414/495 |
| 5,791,860 A | * | 8/1998 | Stockmann | 414/545 |
| 6,692,217 B1 | * | 2/2004 | Pierrou | 414/539 |
| 7,103,952 B2 | * | 9/2006 | Appleton et al. | 29/281.4 |
| 2004/0062630 A1 | * | 4/2004 | Marrero | 414/589 |

FOREIGN PATENT DOCUMENTS

GB 2241690 * 9/1991 ............. 254/8 C

* cited by examiner

*Primary Examiner* — James Keenan
(74) *Attorney, Agent, or Firm* — Suiter Swantz pc llo

(57) ABSTRACT

A universal aircraft mule having a rollable and steerable frame and a load carrying cradle configured for removably supporting and carrying an auxiliary. The frame tiltably and liftably supports the cradle with a lift assembly. The lift assembly raises and lowers the cradle in relation to the frame and tilts the cradle in relation to the frame. The cradle also allows an auxiliary to be skewed within the cradle to facilitate loading and unloading of the auxiliary.

37 Claims, 31 Drawing Sheets

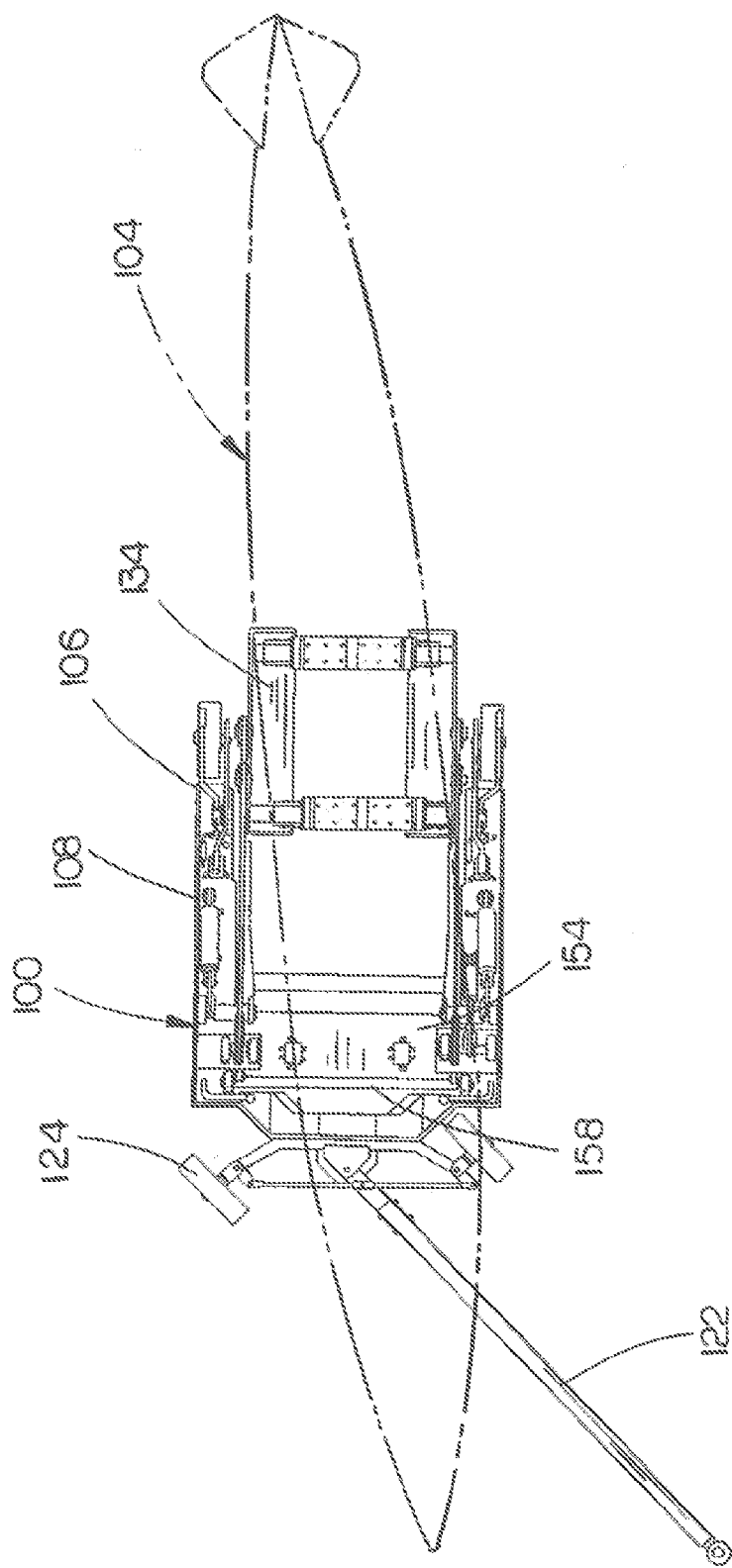

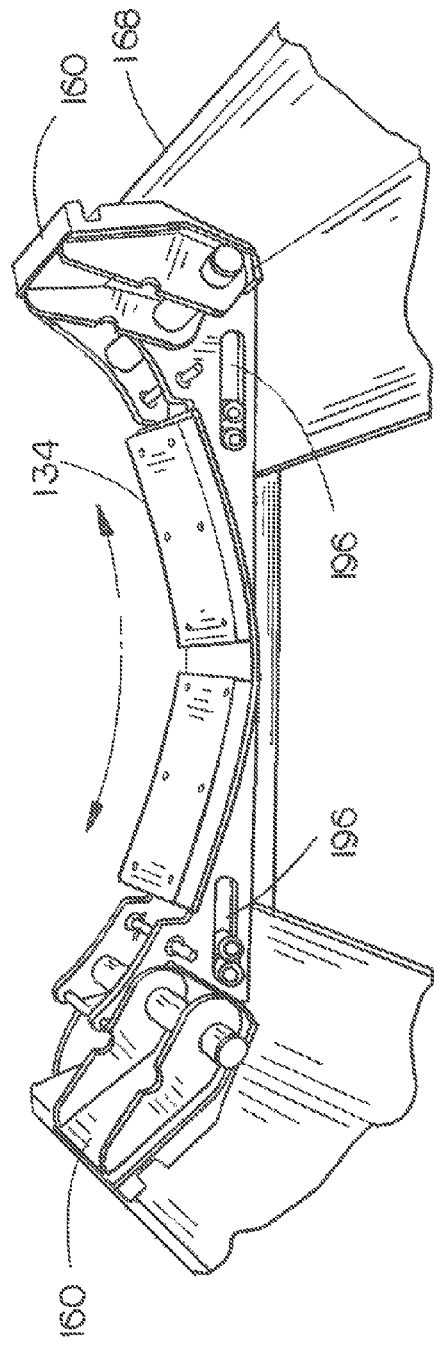
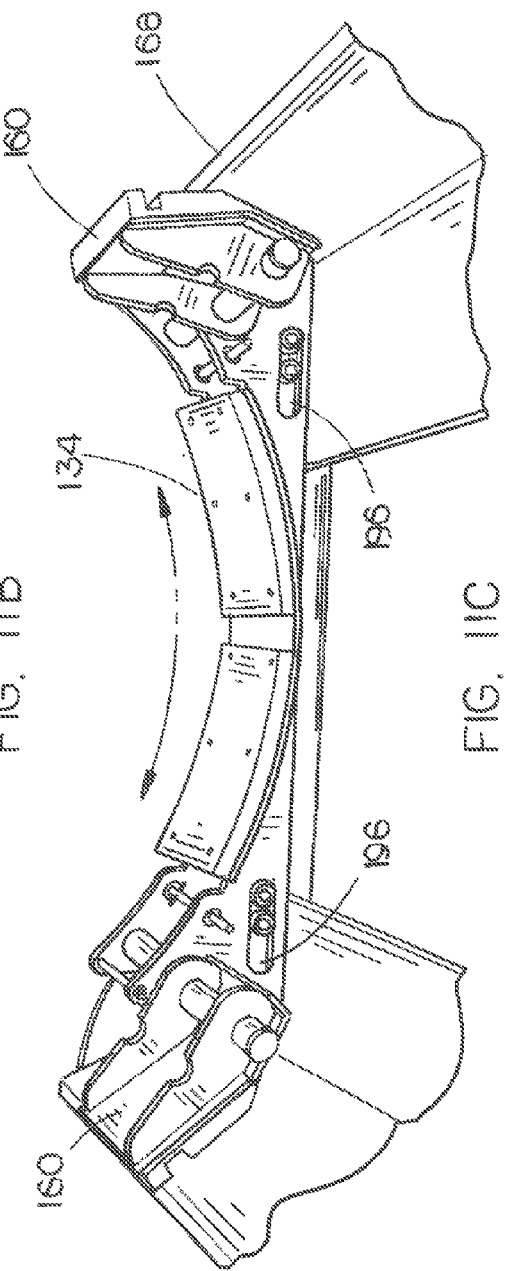
FIG. 11B
FIG. 11C

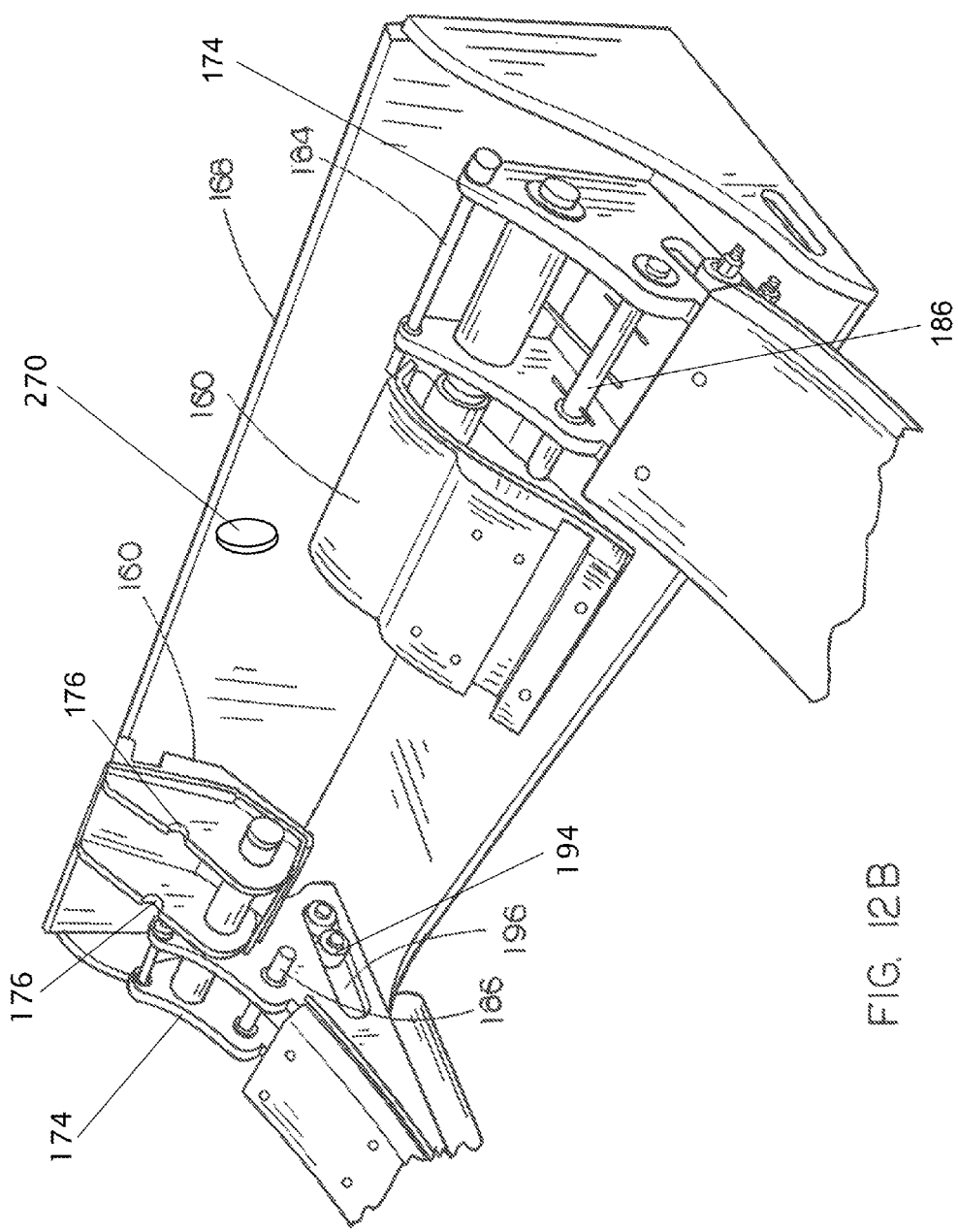

UNIVERSAL AIRCRAFT MULE

TECHNICAL FIELD

The present invention is generally related to barrows, carts, and wheeled transports and more particularly related to mules designed for transporting specialized auxiliary fuel tanks and the like to and from a specific aircraft.

BACKGROUND OF THE INVENTION

Aircraft, especially military aircraft, are often equipped with auxiliaries. Such auxiliaries include fuel tanks (drop tanks), ordinance, drone, sensor pods, storage, and the like. Generally, such auxiliaries are configured to be carried on the fuselage belly or the underside of the wings. It will be appreciated that different aircraft have different dimensions and auxiliary needs. Thus, it is known in the art to provide a specialized cart for use in transporting and facilitating the installation/removal of a particular auxiliary on a particular aircraft.

As aircraft are configured for different missions auxiliaries designed for a particular aircraft and a particular mission are typically removed from storage and transported to an aircraft via a specially configured mule. Such a specially configured mule is designed to carry a single mission specific auxiliary for fitment at a particular location on a particular model of aircraft.

In an operating theater it is not uncommon for a diverse group of aircraft including different models of aircraft designed and configured for different missions to be operated from a single location. This requires the storage of various aircraft, various auxiliaries, and various mules. Additionally, personnel trained in aircraft configuration techniques for each aircraft, auxiliary, and mule must be available. This requires additional storage and operating space, theater equipment transport effort and logistics, personnel and training, and planning.

SUMMARY OF THE INVENTION

The present invention provides a universal aircraft mule for readily and rapidly universally transporting, removing and installing auxiliaries of different sizes and configurations at various locations on different aircraft. The universal aircraft mule may lift and transport auxiliary loads with different masses, centers of gravity, lengths, and widths. The universal aircraft mule is capable of operating in small and confined spaces without damaging aircraft components and without unduly endangering personnel.

BRIEF DESCRIPTION OF THE DRAWINGS

FIG. 10 is a top plan view of a preferred embodiment of the universal aircraft mule of the present invention showing a 600 gallon drop tank in broken lines where the tank is a fully lowered skewed position;

FIGS. 11A, 11B, and 11C are perspective detailed views of the cradle and skew assembly of a preferred embodiment of the universal aircraft mule of the present invention;

FIGS. 12A and 12B are perspective detailed views of the non-rotation stabilizer of the cradle of a preferred embodiment of the universal aircraft mule of the present invention;

Figure 1:
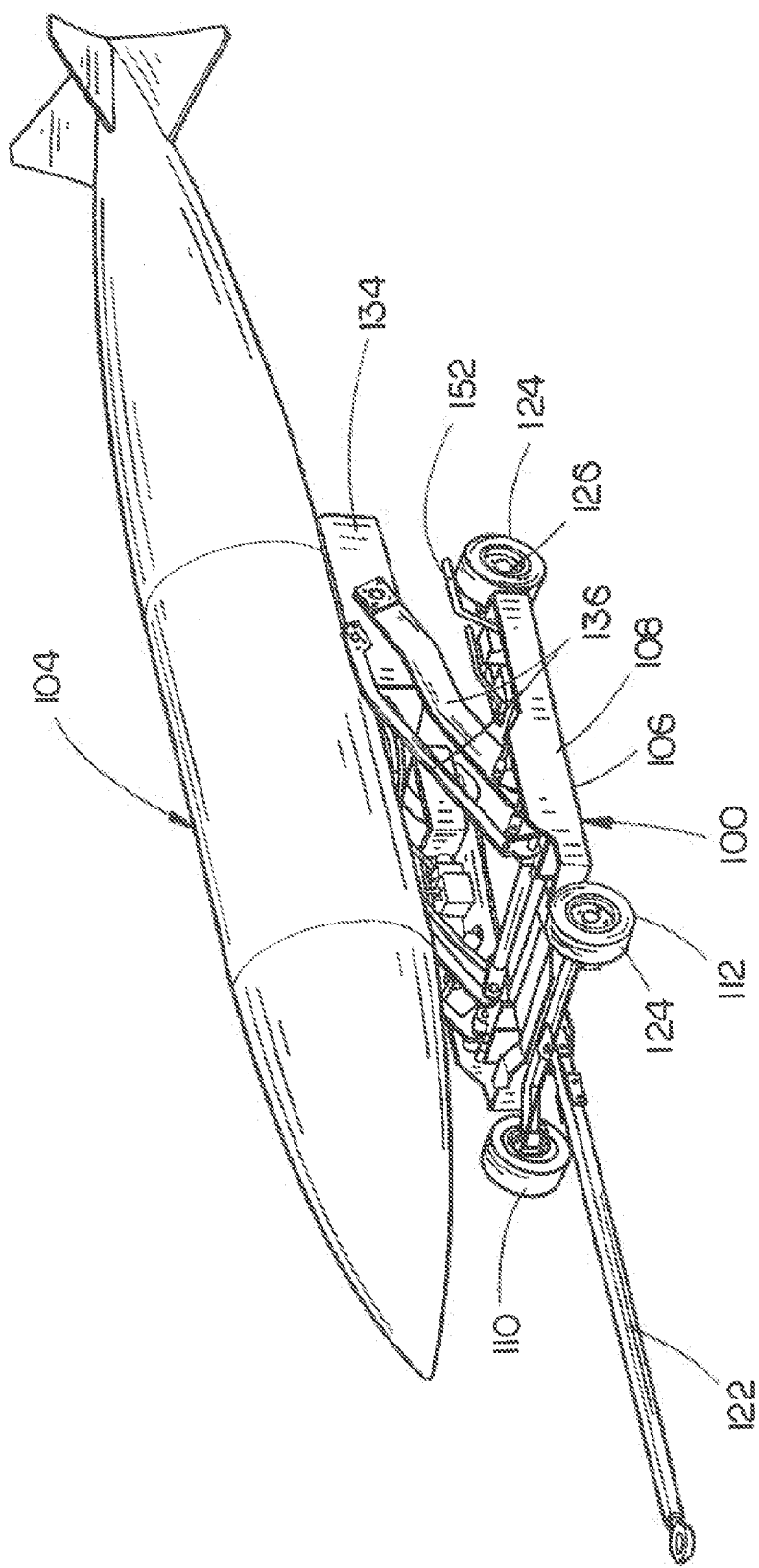
FIG. 1 is a perspective view of a preferred embodiment of the universal aircraft mule of the present invention carrying a 600 gallon auxiliary fuel tank (A-10 Thunderbolt, Sargent-Fletcher belly tank) in a mid-height lifted position.
Figure 2:
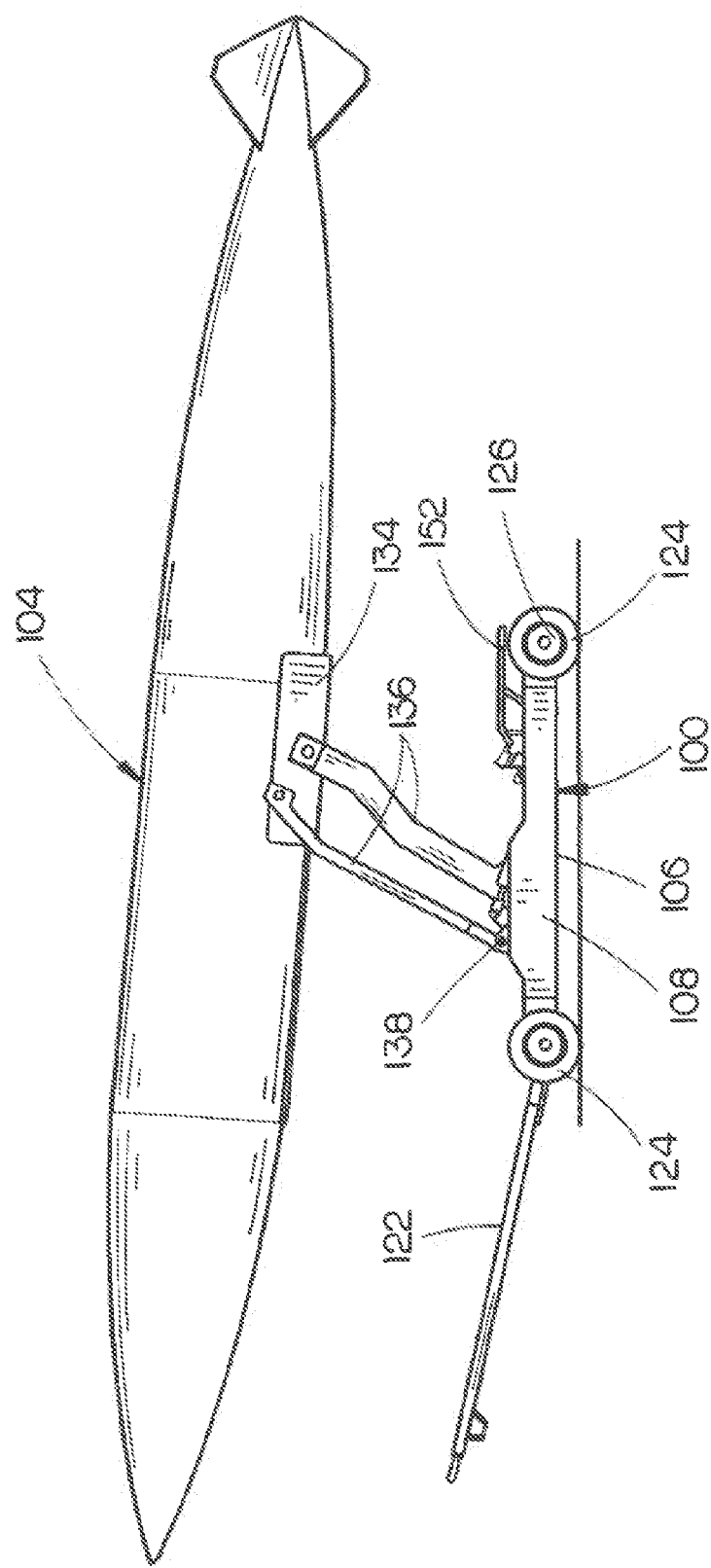
FIG. 2 is a side elevation of a preferred embodiment of the universal aircraft mule of the present invention carrying a 600 gallon auxiliary fuel tank in a partially tilted and substantially fully lifted position.
Figure 3:
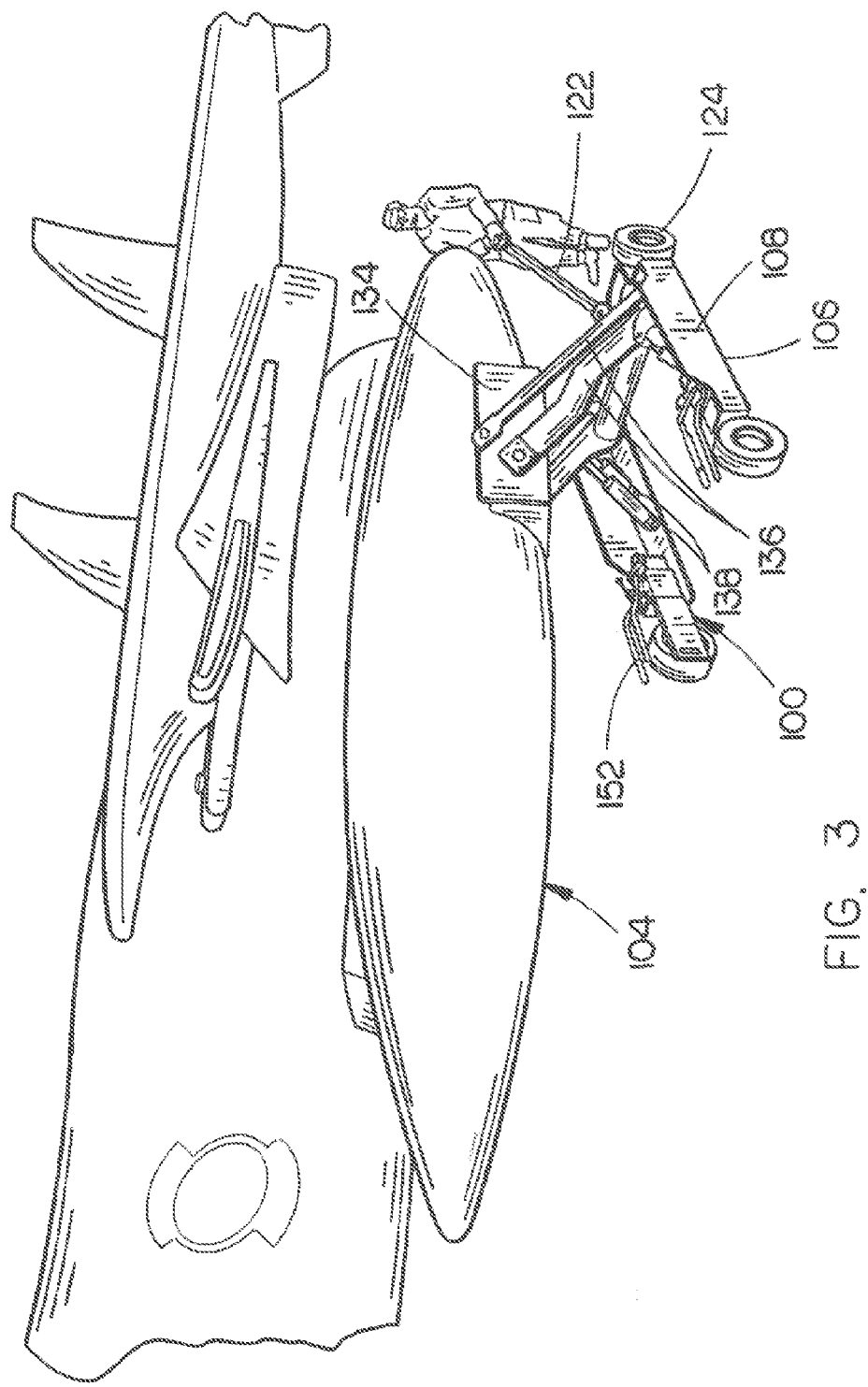
FIG. 3 is a perspective view of a preferred embodiment of the universal aircraft mule of the present invention carrying an auxiliary wing fuel tank (F-15 Eagle) in an aligned partially lifted position.
Figure 4:
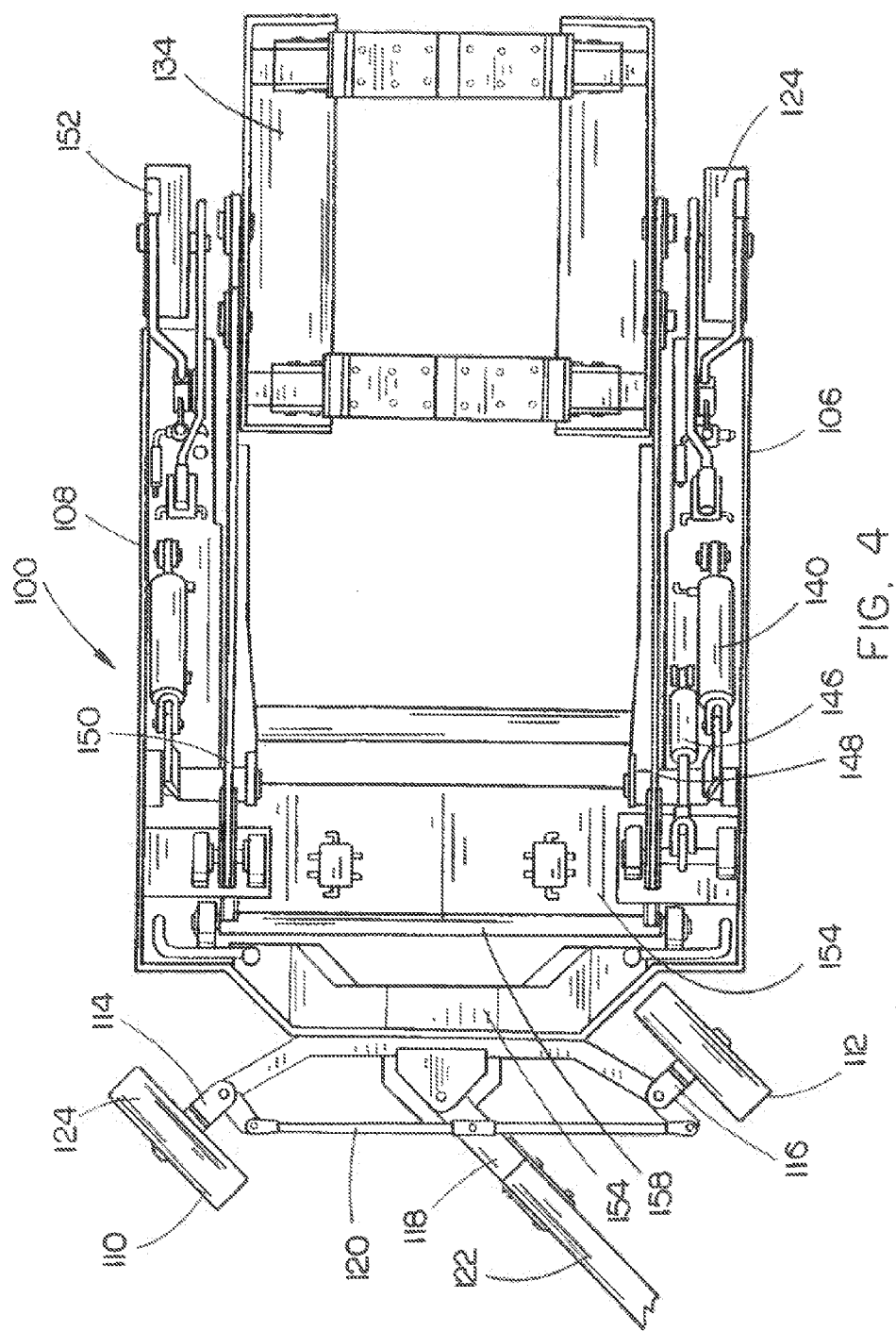
FIG. 4 is a top plan view of a preferred embodiment of the universal aircraft mule of the present invention illustrating the steering assembly, lifting and tilting mechanisms, the cradle and skewing assembly, and the hydraulic system.
Figure 5:
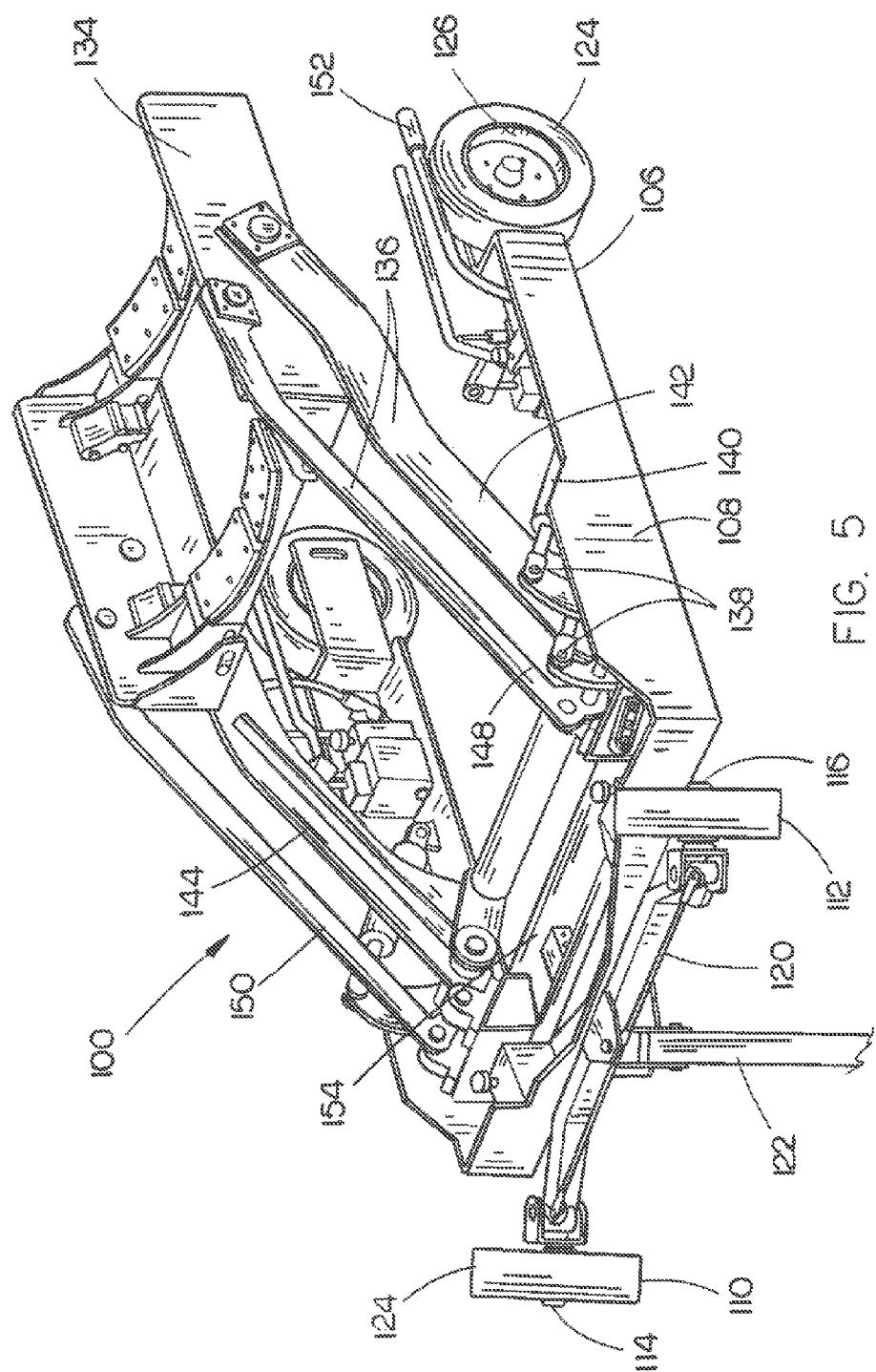
FIG. 5 is a perspective top view of a preferred embodiment of the universal aircraft mule of the present invention in a partially lifted position.
Figure 6:
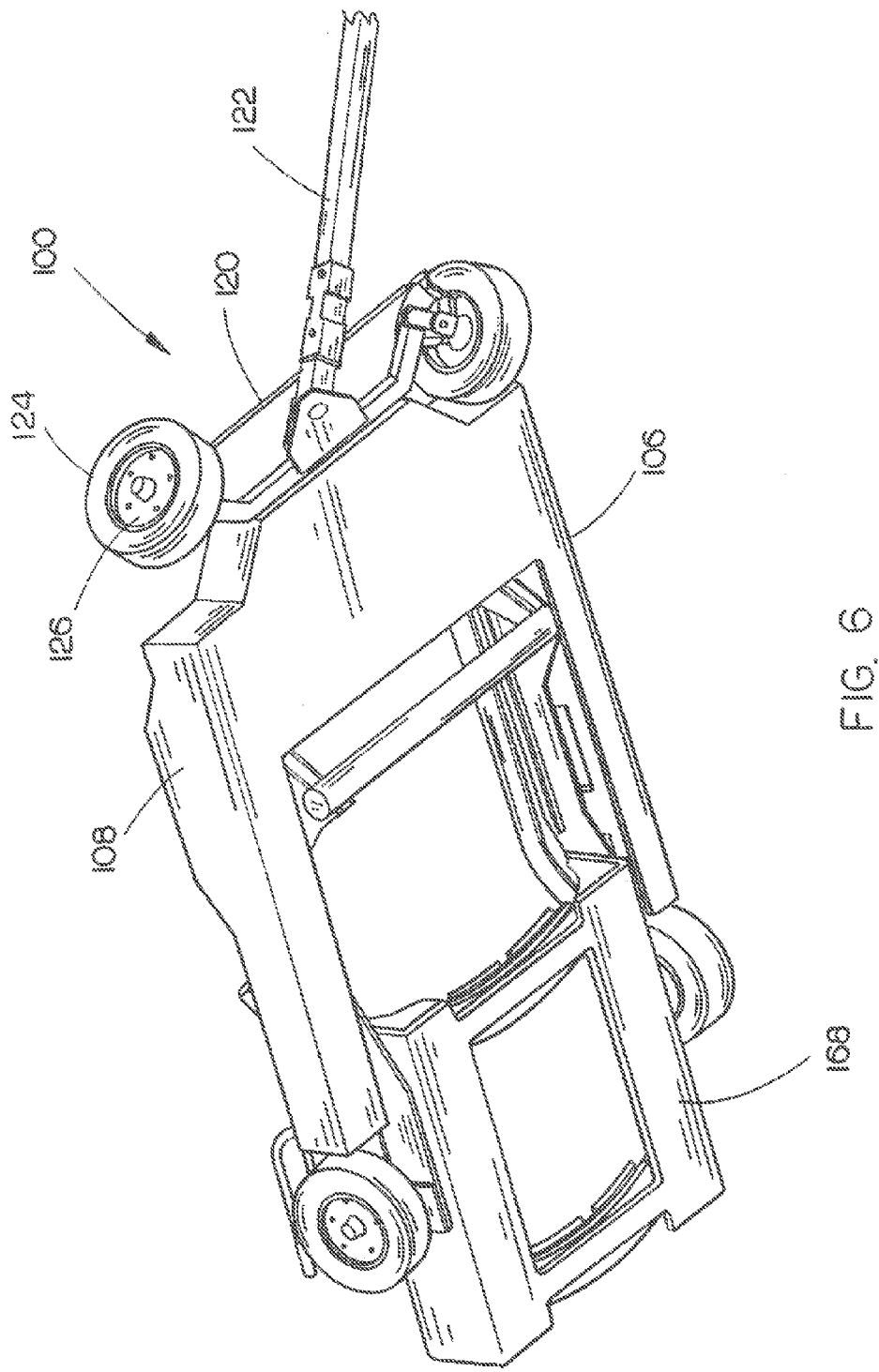
FIG. 6 is a perspective bottom view of a preferred embodiment of the universal aircraft mule of the present invention illustrating the non-sparking skid, steering assembly, and the mule's flat low profile and lifting assembly for providing a near ground height to over approximately 1.5 meter lift envelope.

| Reference Numeral Key |
|---|
| universal aircraft mule 100 |
| mechanized storage assembly 102 |
| aircraft tank 104 |
| rollable frame 106 |
| non-sparking skid plate 108 |
| pair of wheels 110 and 112 |
| pair of axles 114 and 116 |
| steering arm 118 |
| tie rod 120 |
| steerable tow bar 122 |
| tire 124 |
| split rim 126 |
| parking brake assembly 128 |
| brake plate 130 |
| spring-loaded pin 132 |
| lateral floating carriage 134 |
| lift linkage 136 |
| pivotable connections 138 |
| first hydraulic cylinder 140 |
| aft port lifting bar 142 |
| aft starboard lifting bar 144 |
| second hydraulic cylinder 146 |
| fore port tilting bar 148 |
| fore starboard tilting bar 150 |
| pump bar 152 |
| central hydraulic reservoir 154 |
| fluid level indicator 156 |
| torsional load stabilizer 158 |
| anti-rotation stabilizers 160 |
| tank metering valve 162 |
| pallet 164 |
| transport height locking device 166 |
| cradle 168 |
| mule guide 170 |
| tilt indicator 172 |
| cradle spacer 174 |
| stabilizer slots 176 |
| tilt hydraulic reservoir 180 |
| counter balance 182 |
| strap retention pin 184 |
| cradle spacer lock 186 |
| load recess 188 |
| tilt direction control 190 |
| descent rate controller 192 |
| pivot bearings 194 |
| pivot slots 196 |
| pressure relief valve 198 |
| second hydraulic system (tilting) 200 |
| tilt cylinder 202 |
| first and second counter balance 204, 206 |
| first and second gauge isolator 208, 210 |
| first hand pump 252 |
| second hand pump 254 |
| first hydraulic system (lifting) 300 |
| lifting cylinder 302 |
| velocity fuse 304 |
| first and second compensators 306, 308 |

| -continued |
|---|
| Reference Numeral Key |
| first lift hand pump 310 |
| second lift hand pump 312 |
| first and second lift gauge isolators 314, 316 |

DESCRIPTION OF THE PREFERRED EMBODIMENT

The present invention provides a universal aircraft mule and system for loading/unloading and storing auxiliaries, which may be utilized for multiple aircraft and multiple auxiliaries.

Referring now to FIGS. 1 through 29, a universal aircraft mule 100 is described. The universal aircraft mule 100 may be utilized for both lifting and tilting an auxiliary wing and/or an auxiliary fuselage tank, and for moving and positioning the auxiliary wing/auxiliary fuselage tank for storage and/or for mounting on the body of an aircraft. For example, the universal aircraft mule 100 may be utilized in an aircraft component storage facility. The storage facility may include a device, such as a mechanized storage assembly 102, or the like, for sequentially presenting an auxiliary wing and/or an auxiliary fuselage tank to the universal aircraft mule 100. The universal aircraft mule 100 may include a cradle 168 for lifting and pointing an aircraft tank 104 supported by the cradle 168. The aircraft tank 104 may be pointed in a direction (e.g., horizontal) for receiving by an aircraft having a structure configured for removably receiving the aircraft tank 104.

The universal aircraft mule 100 includes a rollable frame 106. In embodiments, the rollable frame 106 includes a non-sparking skid plate 108. For example, the non-sparking skid plate 108 may include one or more composite friction pads for non-sparking engagement with a paved surface supporting the rollable frame 106. A paved surface may include an asphalt surface, a concrete surface, or the like. The rollable frame 106 is movably steerable in both a first direction (e.g., forwards) and a second direction opposing the first direction (e.g., backwards).

The universal aircraft mule 100 includes a steering mechanism attached to the rollable frame 106 for movably steering the frame. In embodiments, the steering mechanism may include a pair of wheels 110 and 112 and a pair of axles 114 and 116. Each wheel of the steering mechanism is rotationally connected to the rollable frame 106 via one of the axles. Further, each wheel is connected to a steering arm 118 via a tie rod 120. The steering arm may be coupled with a tow bar (e.g., steerable tow bar 122) for turning, pushing, and/or pulling the universal aircraft mule 100. In embodiments, the steerable tow bar 122 may be fabricated from a strong, light-weight material, such as aluminum, a composite material, or another material, such as an alloy with a high strength-to-weight ratio. Each wheel may include a solid rubber tire 124 and a split rim 126.

The universal aircraft mule 100 may also include a parking brake assembly 128. The parking brake assembly 128 may be associated with one or more of the wheels (e.g., wheel 112). In embodiments, the parking brake assembly 128 may include a brake plate 130 associated with wheel 112 and a spring loaded pin 132 lockingly engageable with the brake plate 130. Thus, the spring loaded pin 132 may be engaged with the brake plate 130 for locking the wheel 112 in place and preventing unwanted movement of the universal aircraft mule 100.

The universal aircraft mule 100 includes a lift assembly attached to the rollable frame 106. The lift assembly includes a cradle 168 having a first side, a second side, a front, and a back. The cradle 168 is operably attached to the lift assembly and configured for supporting an auxiliary fuel tank, such as aircraft tank 104. For example, the cradle 168 may include a lateral floating carriage 134 connected to the rollable frame 106 and supported by a lift linkage 136. In embodiments, the lift linkage 136 may be generally parallelogram-shaped. The lift linkage 136 of the lifting mechanism may be pivotally attached to the rollable frame 106 and positioned aft (i.e., behind) of the first wheel 110 and the second wheel 112. In embodiments, pivotable connections 138 may include bronze bearings and/or ball bearings.

For instance, the lift linkage 136 may include a first hydraulic cylinder 140 pivotally driving an aft port lifting bar 142 and an opposing aft starboard lifting bar 144. The aft port lifting bar 142 and the aft starboard lifting bar 144 are pivotably connected at aft positions to the first and second sides of the lateral floating carriage 134. The first hydraulic cylinder 140 is included with a first user operable hydraulic system for raising and lowering the cradle 168 between a first generally horizontal plane occupied by the rollable frame 106 and a second generally horizontal plane parallel to and separate from the first generally horizontal plane.

Further, the lift linkage 136 may include a second hydraulic cylinder 146 for pivotally driving (in generally parallel arrangement to the aft port lifting bar 142 and the aft starboard lifting bar 144) a fore port tilting bar 148 and a fore starboard tilting bar 150. The fore port tilting bar 148 and the fore starboard tilting bar 150 are pivotally connected to fore positions of the lateral floating carriage 134. The second hydraulic cylinder 146 is included with a second user operable hydraulic system for tilting the cradle 168 and adjusting an angle of the cradle 168 relative to the horizontal (e.g., an angle in relation to the first and second planes generally parallel to the generally horizontal plane occupied by the rollable frame 106.

The universal aircraft mule 100 includes hydraulic controls for each of the first and second user operable hydraulic systems. In embodiments, the hydraulic controls (e.g., pump bar 152) may be operated from either the port or starboard sides of the universal aircraft mule 100. The hydraulic controls may be fed with hydraulic fluid from a central hydraulic reservoir 154 positioned behind the first wheel 110 and the second wheel 112. The central hydraulic reservoir 154 may include a fluid level indicator 156.

Further, the universal aircraft mule 100 may include a hydraulic tilt lock for lockably controlling the amount of tilt for the cradle 168 in a given position. The hydraulic tilt lock may be operable under load at any tilt and height that may be accomplished by the lift linkage 136. The universal aircraft mule 100 may also include a torsional load stabilizer 158. In embodiments, the universal aircraft mule 100 is counter-balanced by the arrangement of the cradle 168 in relation to the rollable frame 106. Additionally, the arrangement of the lateral floating carriage 134 allows the cradle 168 to be skewed (e.g., rotated from a direction parallel to a longitudinal axis of the frame) in a generally horizontal plane.

The lateral floating carriage 134 may include one or more anti-rotation stabilizers 160 for preventing substantial rotation of a load carried by the universal aircraft mule 100 (e.g., the aircraft tank 104). The first hydraulic system may include a height descent rate control (e.g., a tank metering valve 162) for adjustably controlling the rate at which the height of the cradle 168 is allowed to move in a vertical descent.

In a presently preferred embodiment, the universal aircraft mule 100 may be utilized to transport any auxiliary, herein and by example, the mule 100 is shown configured to transport a center tank, a wing tank, and/or an A-10 aircraft tank. Further, the universal aircraft mule 100 may include one or more optical (e.g., markings/indicia), mechanical (e.g., latches, tabs, and/or flanges), or electrical (e.g., switches/contacts) positional guidance mechanisms 270 for facilitating (e.g., guiding) loading and unloading of payloads on the universal aircraft mule 100 (e.g., from an aircraft, a storage facility, or the like).

The universal aircraft mule 100 may be designed to stack with other universal aircraft mule 100 units along a vertical axis such that the longitudinal axes of the units are generally parallel, and the units are stackable on a shipping pallet 164. Additionally, the universal aircraft mule 100 may include a transport height locking device 166, or preventing the units from expanding during shipping and/or transport of the units.

Figure 7:
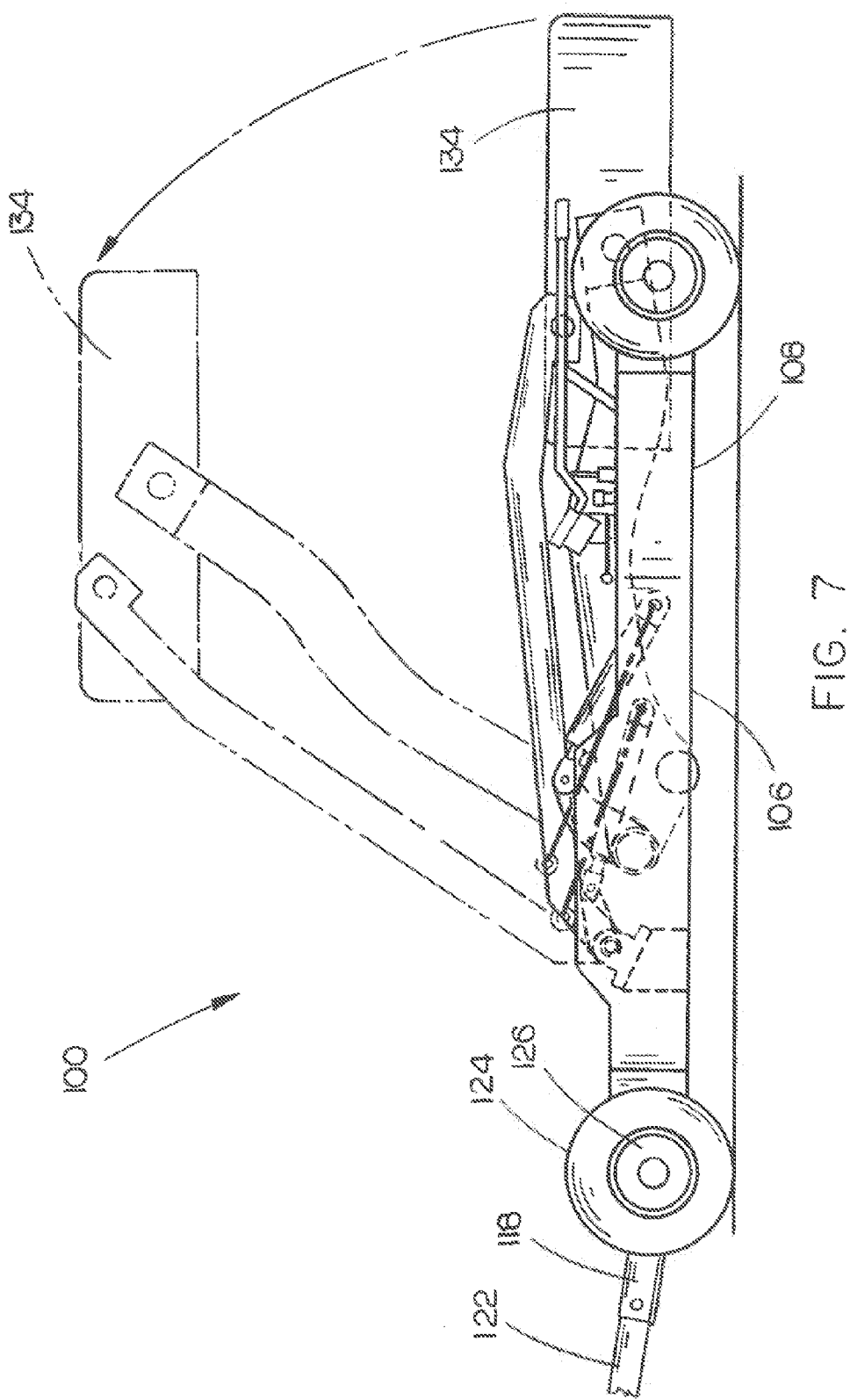
FIG. 7 is a side elevational view of a preferred embodiment of the universal aircraft mule of the present invention showing the cradle and lift assembly operating range.
Figure 8:
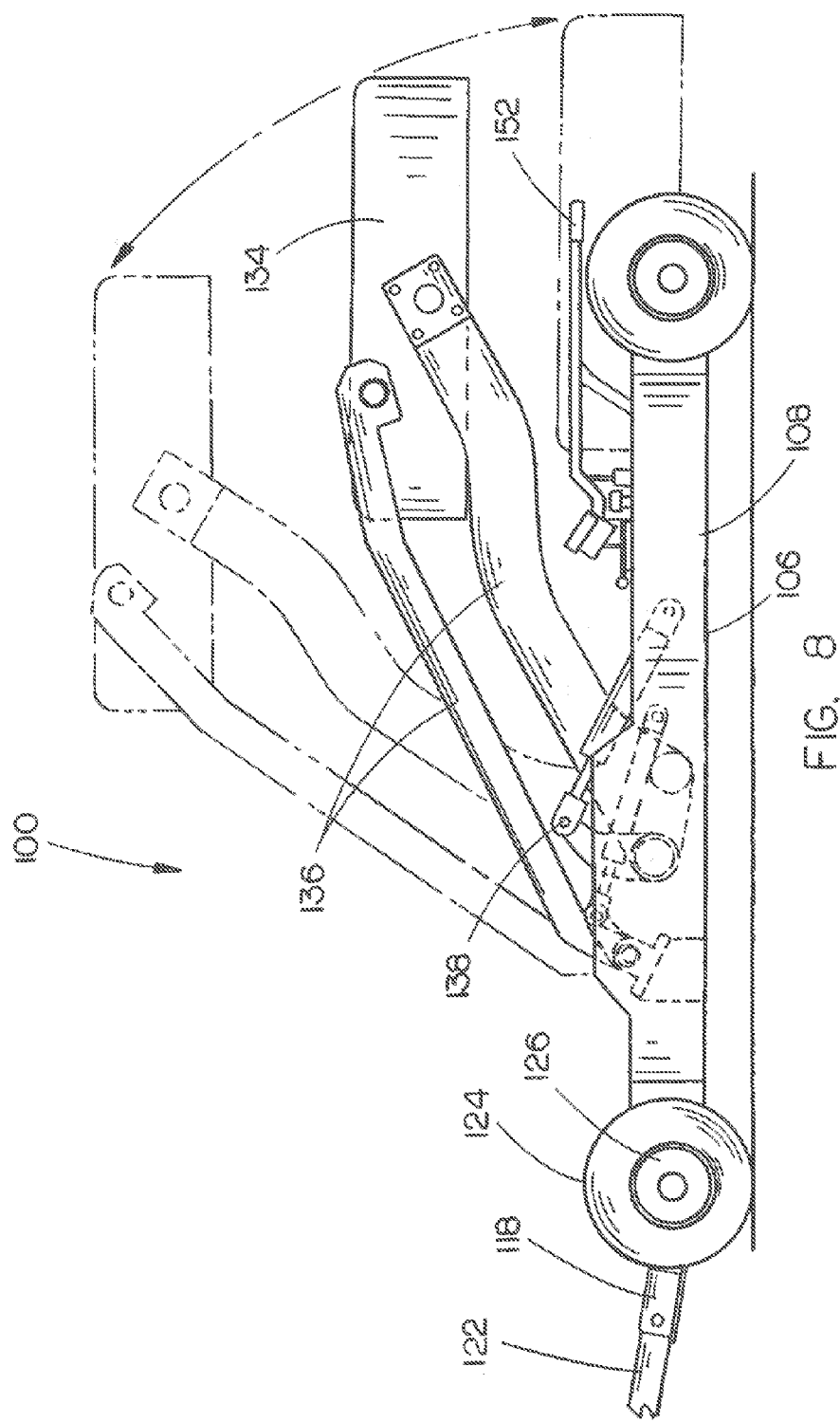
FIG. 8 is a side elevational view of a preferred embodiment of the universal aircraft mule of the present invention showing the lift assembly in various positions.
Figure 9:
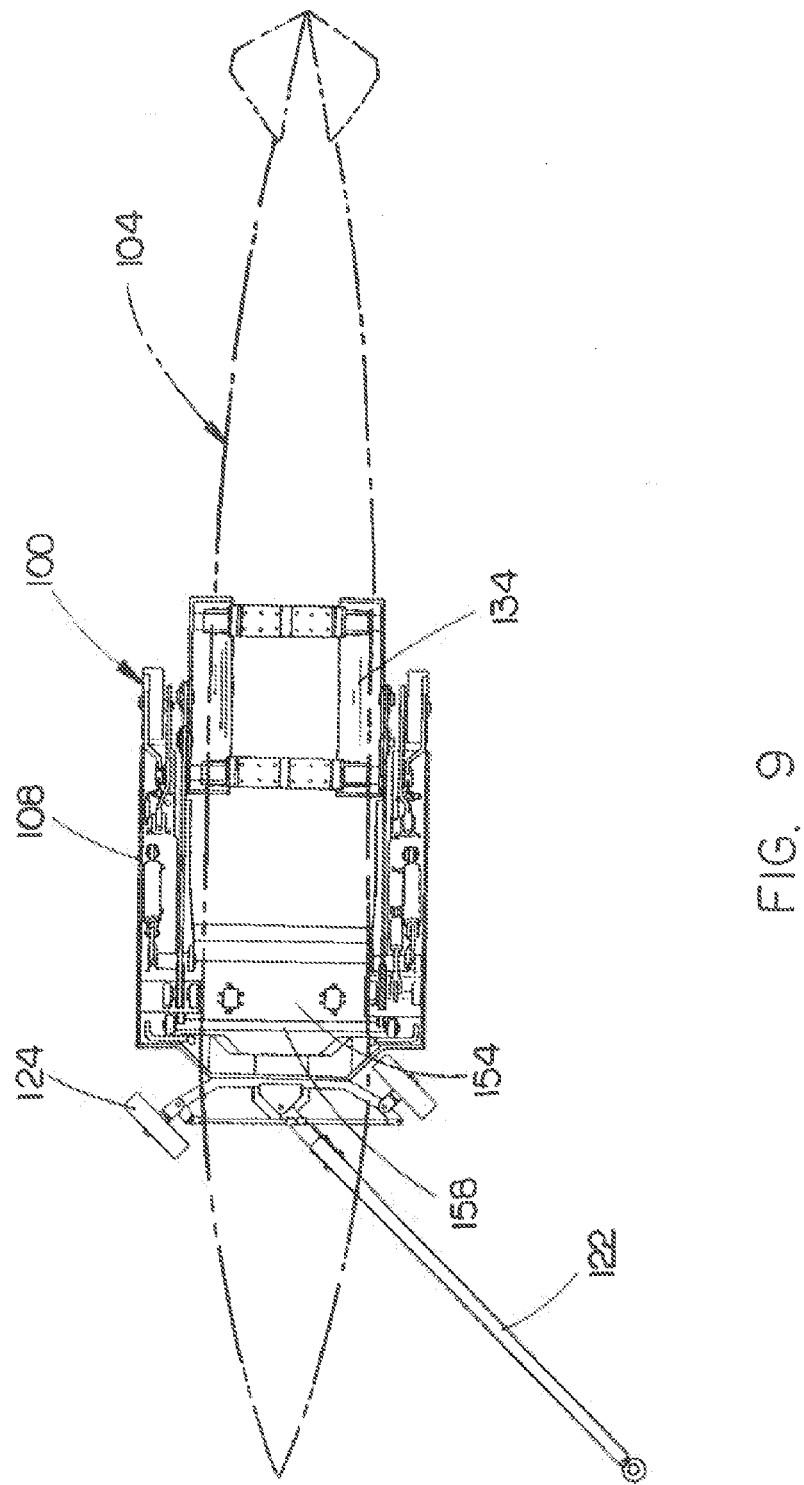
FIG. 9 is a top plan view of a preferred embodiment of the universal aircraft mule of the present invention showing a 600 gallon drop tank in broken lines where the tank is in a fully lowered non-skewed position.
Figure 11A:
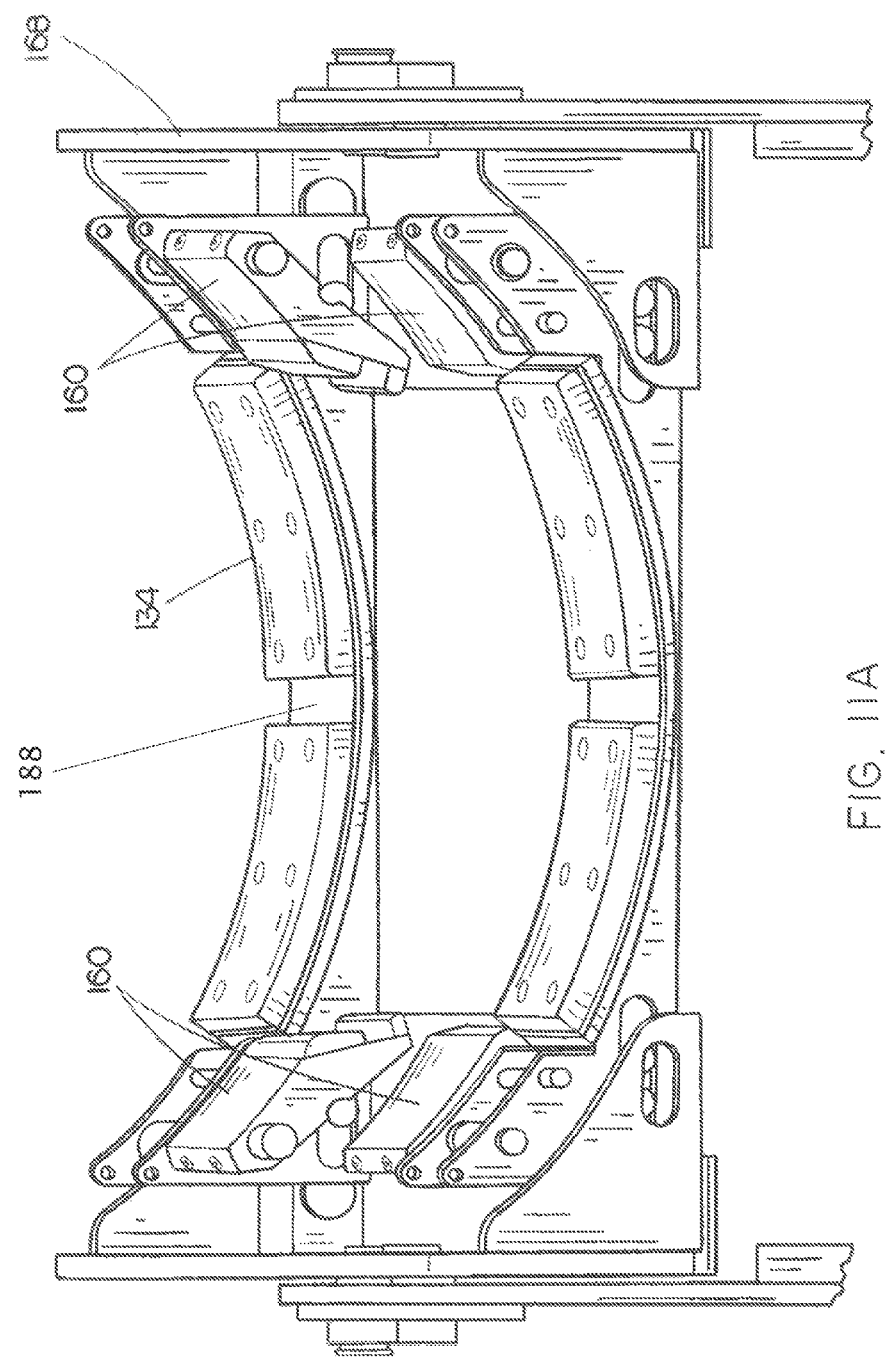
Figure 12A:
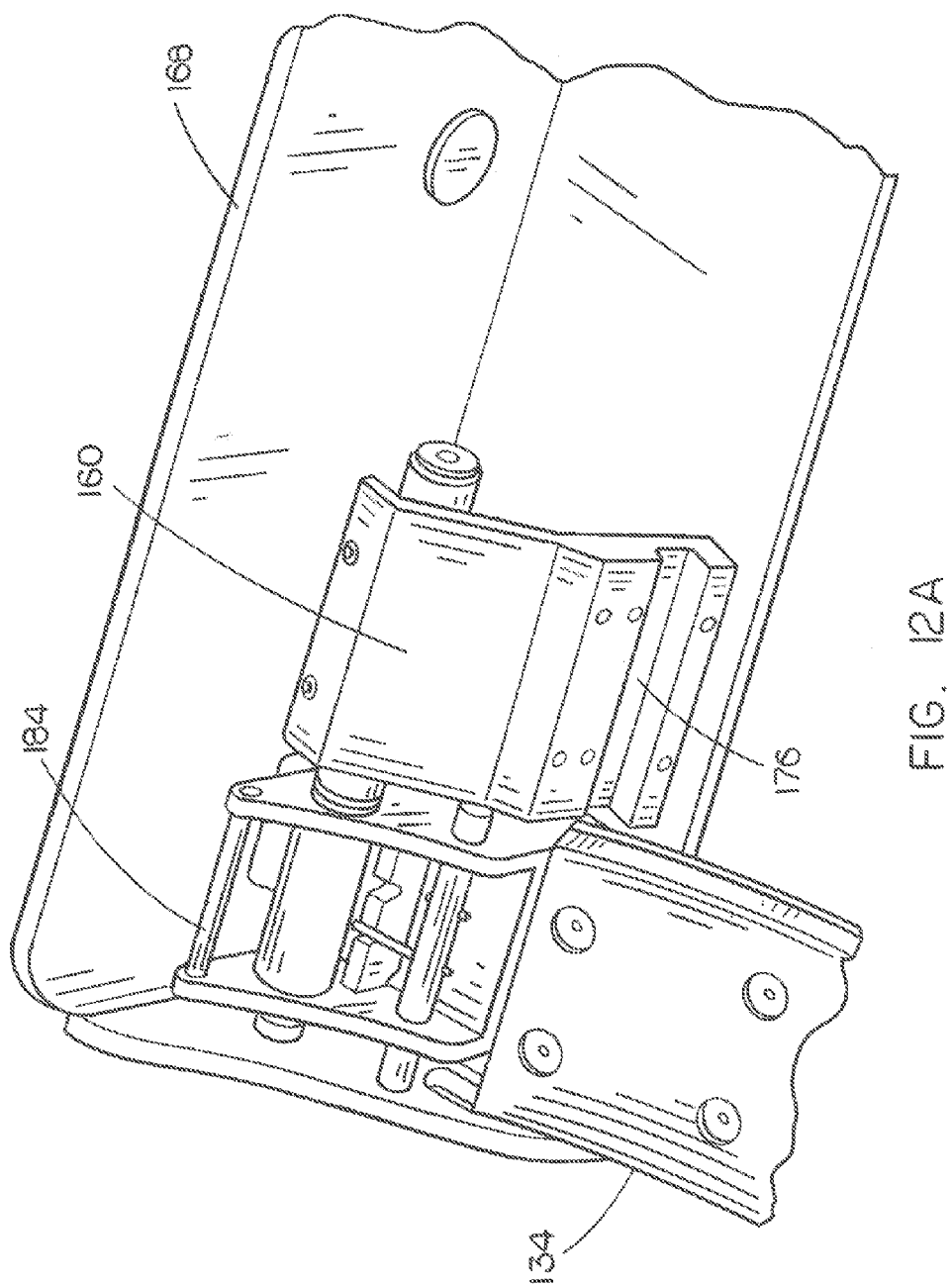
Figure 13:
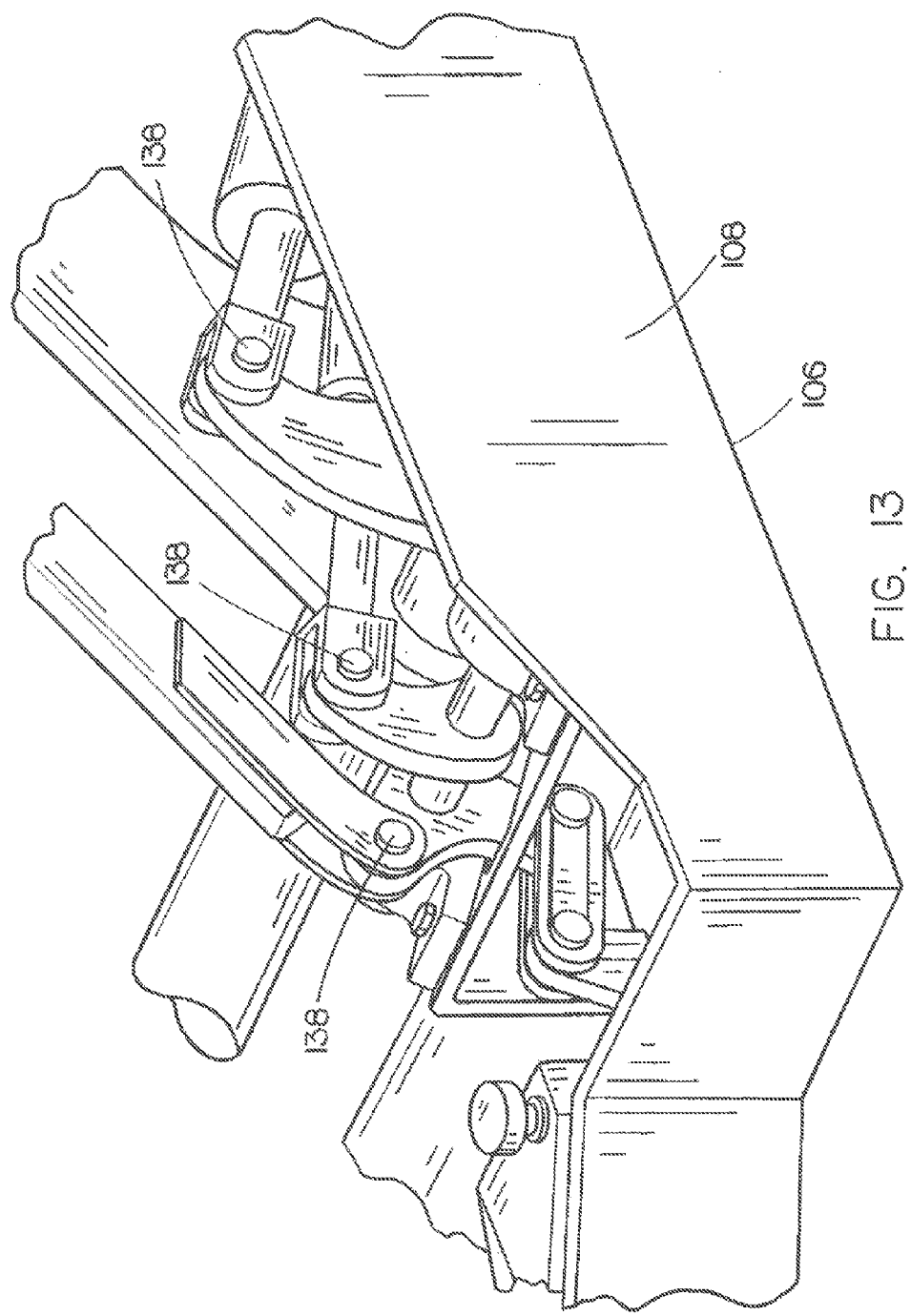
FIG. 13 is a detailed perspective view of the hydraulic lift and tilt assembly of a preferred embodiment of the universal aircraft mule of the present invention.
Figure 14:
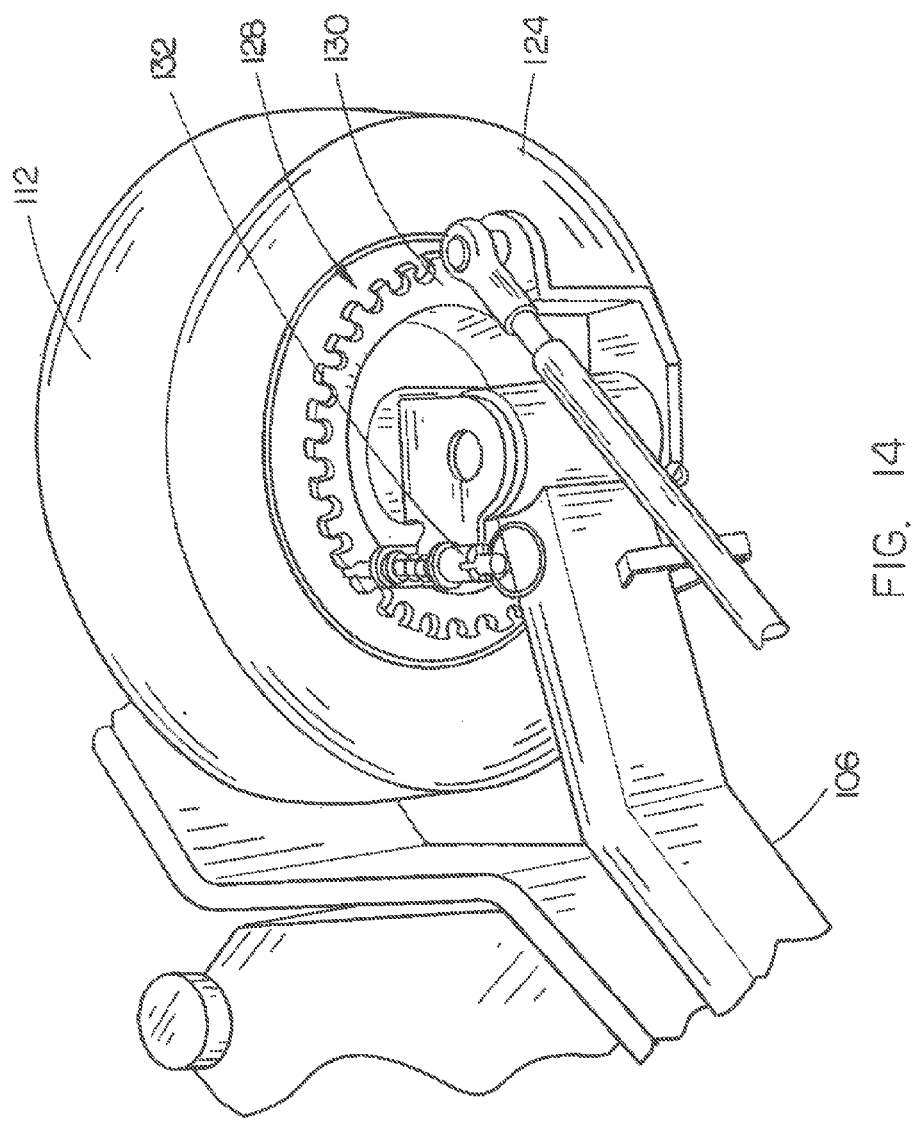
FIG. 14 is a detailed perspective view of steering a parking brake assembly of a preferred embodiment of the universal aircraft mule of the present invention.
Figure 15:
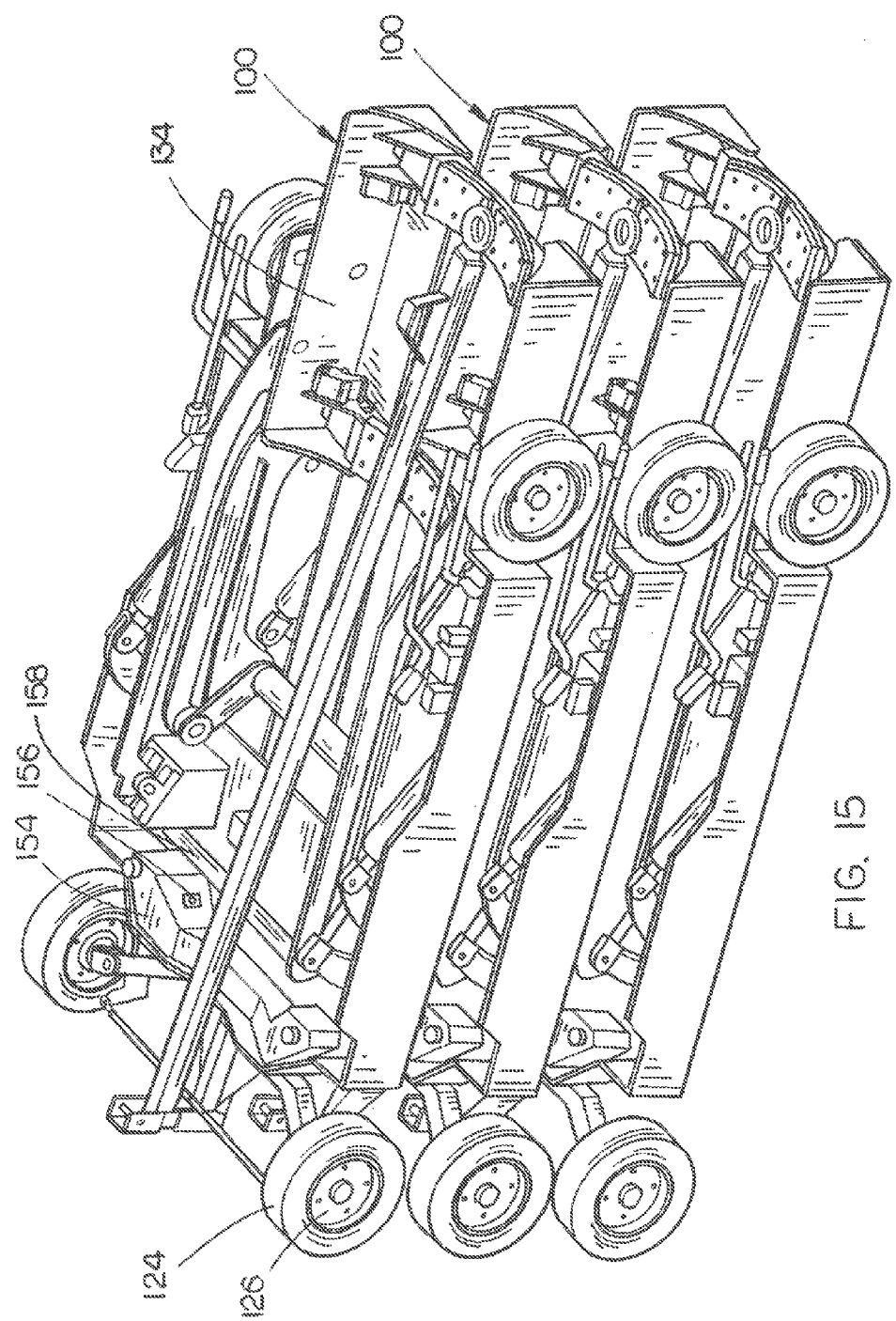
FIG. 15 is a perspective view of three of the universal aircraft mules of the present invention in a stacked for storage/shipping configuration.
Figure 16:
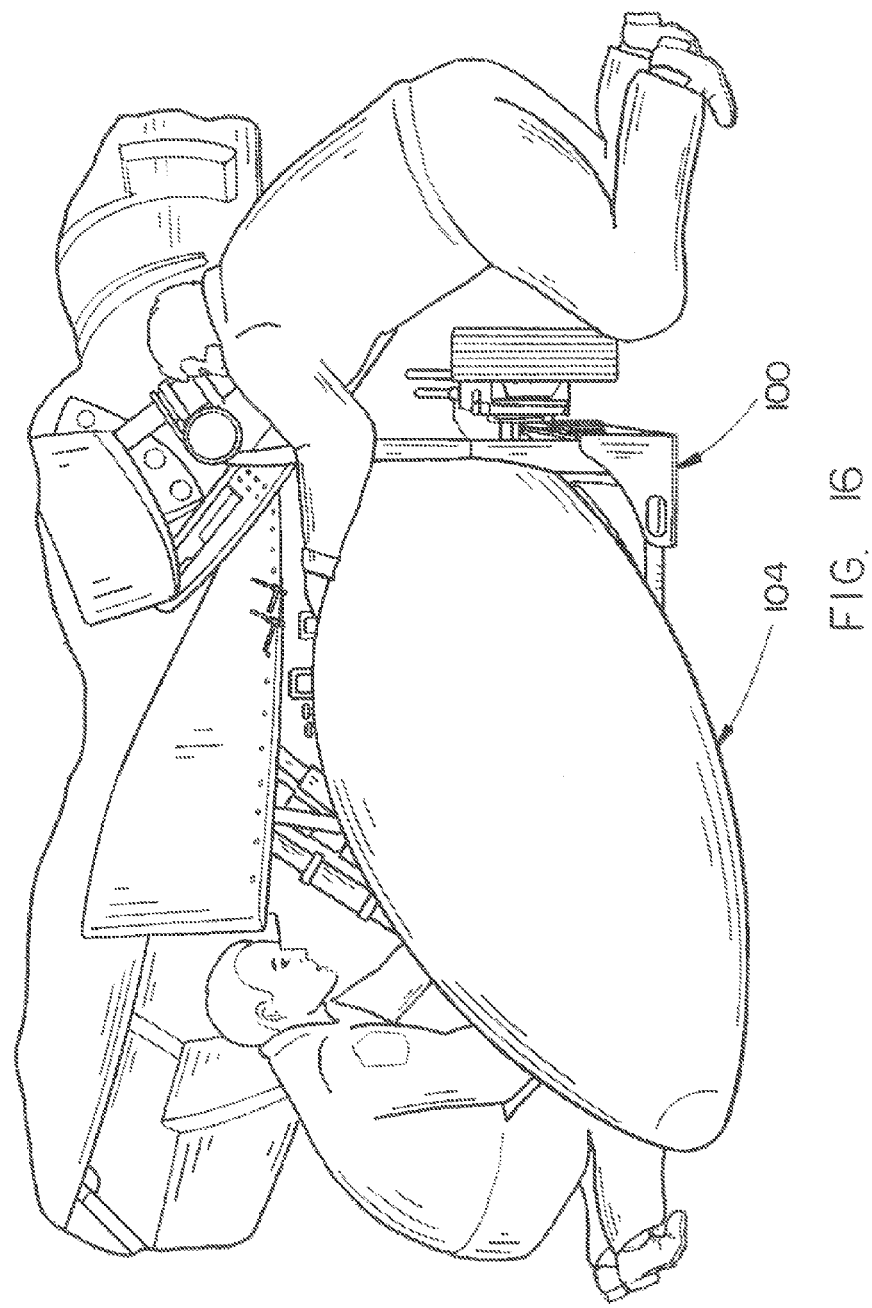
FIG. 16 is a frontal perspective view of the universal aircraft mule of the present invention wherein an auxiliary wing tank is being installed on an F-16 Fighting Falcon.
Figure 17:
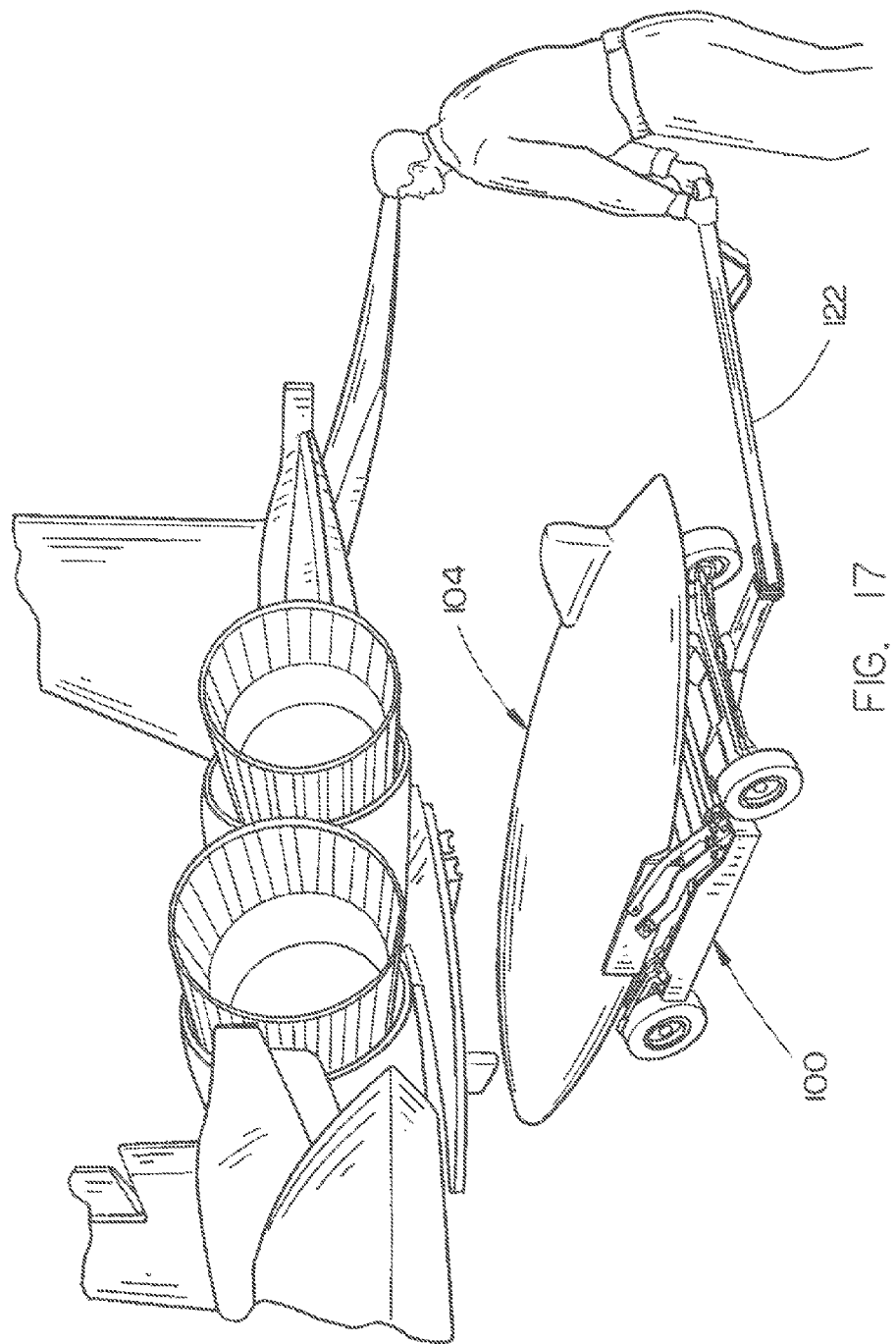
FIG. 17 is a perspective view of the universal aircraft mule installing/removing a belly drop tank from an F-15.
Figure 18:
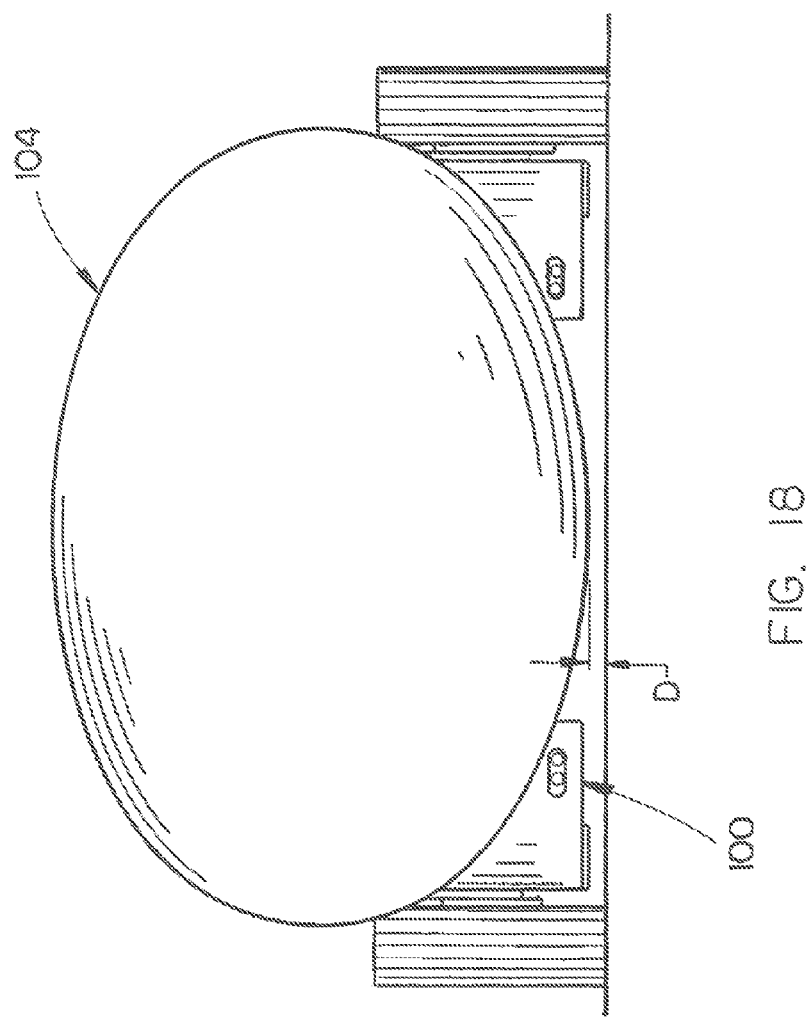
FIG. 18 is a front perspective view of the universal aircraft mule illustrating the low end of the mule's cradle operating envelope.
Figure 19:
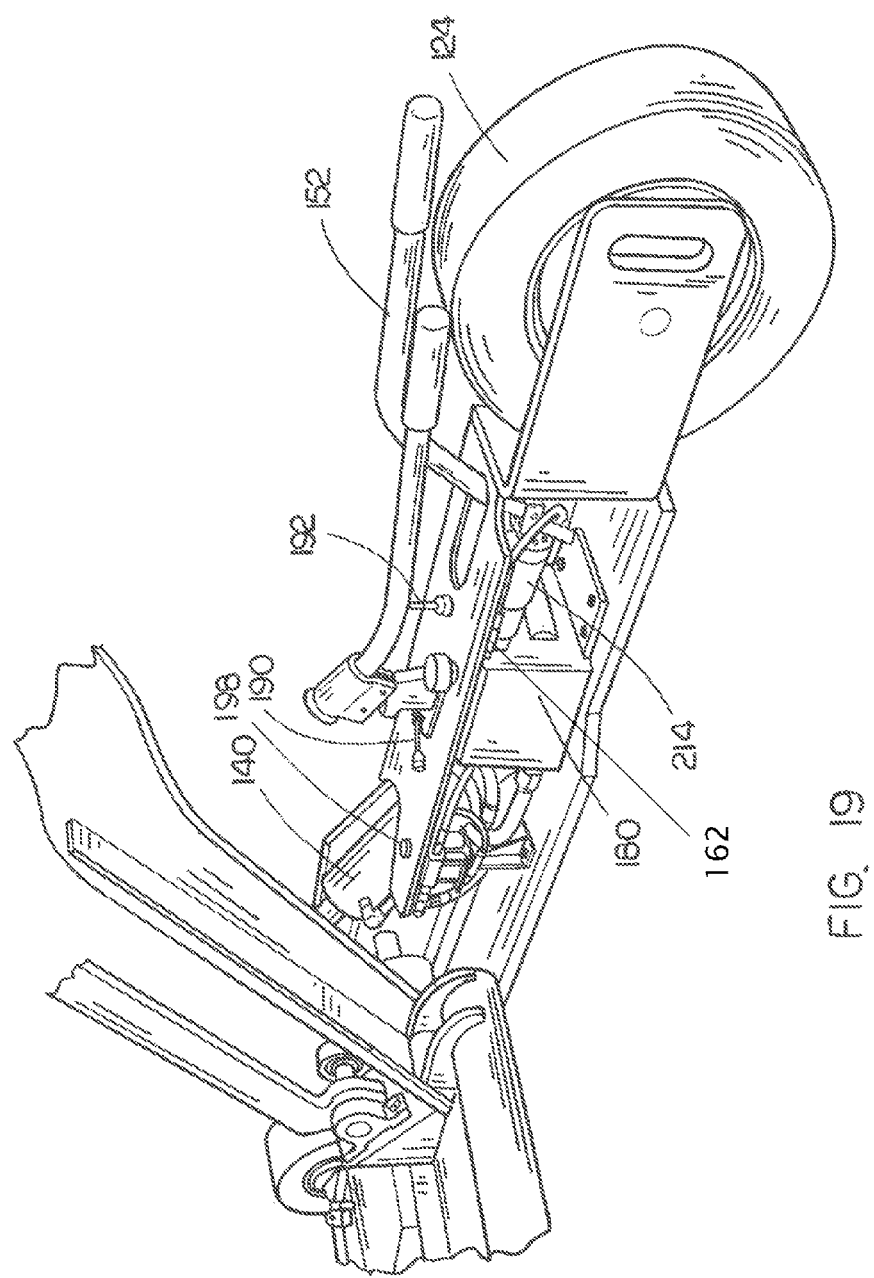
FIG. 19 is a side perspective view of the starboard side of the U-frame of a presently preferred embodiment.
Figure 20:
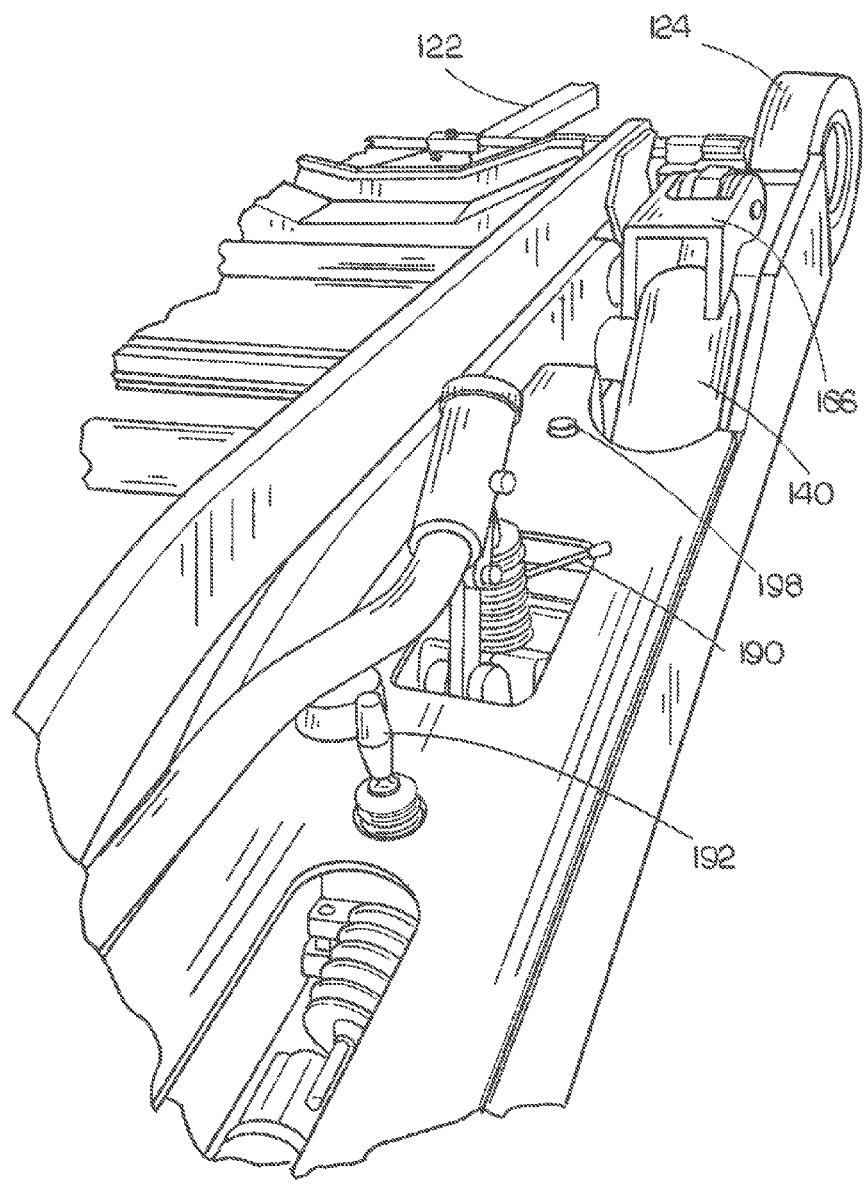
FIG. 20 is a top perspective view of the transport height locking device, pump handle pressure release valve, tilt direction control, tilt pump, and toe-activated descent controller.

It will be appreciated from a review of FIGS. 7, 16, and 18 that the universal aircraft mule can carry an auxiliary at a height very low to the ground. As will be noted from FIG. 7, in a preferred embodiment, the bottom of the auxiliary may be carried at a height approximately equal to the wheel axle height.

Figure 28:
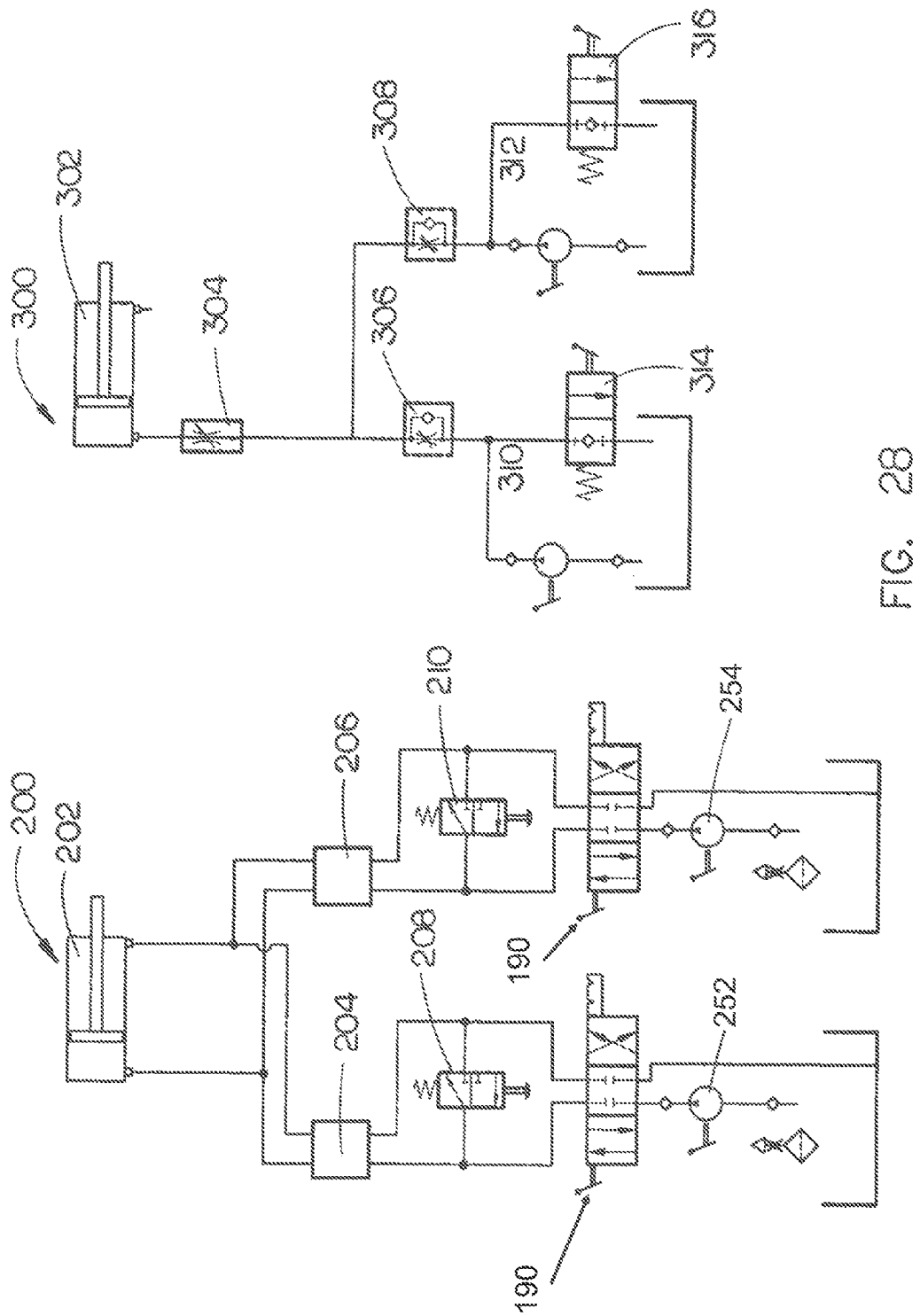
FIG. 28 is a schematic diagram of the lifting (first) and tilting (second) hydraulic systems of a preferred embodiment of the present invention.
Figure 29:
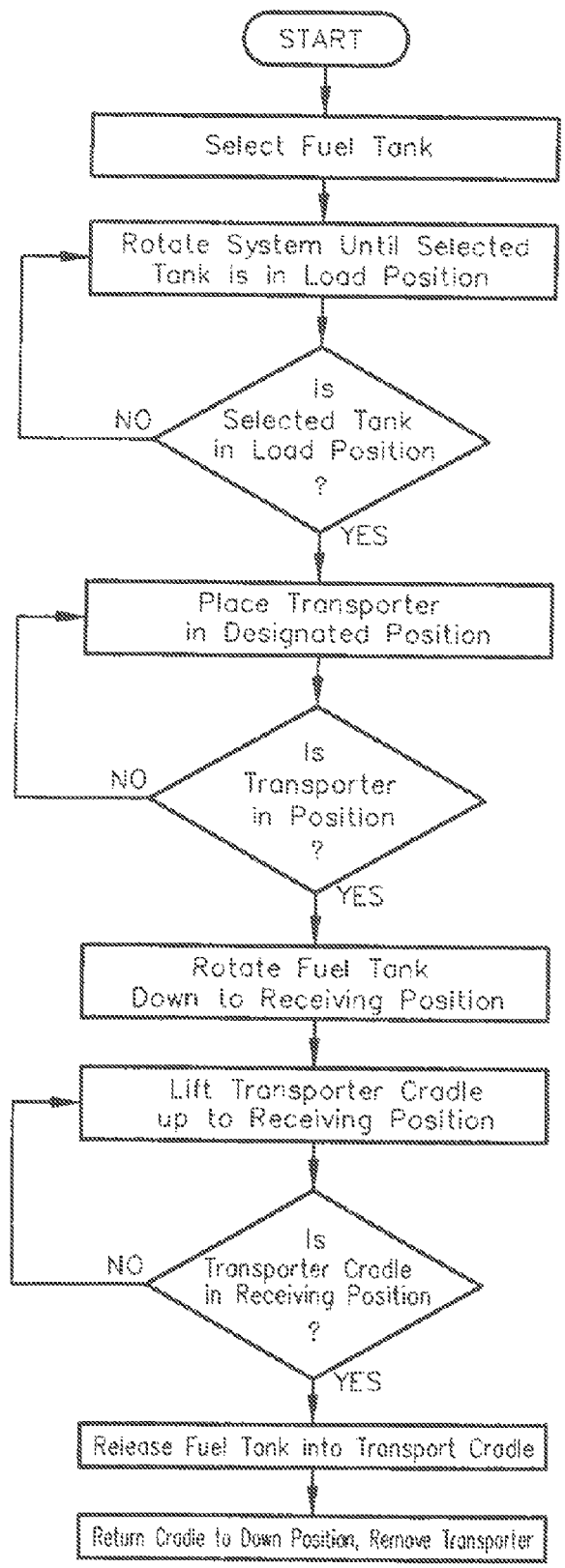
FIG. 29 is a flow diagram of operation of the load/unload logic/sequence of the presently preferred embodiment of the system of the present invention.

FIG. 28 schematically illustrates both the lifting and tilting hydraulic systems. The tilting system 200 includes a bidirectional (double acting) hydraulic cylinder operably pressurized via a reservoir 154 filled with hydraulic fluid. An operator may extend or retract the hydraulic cylinder 202 utilizing either hand pump 212 or 214. Dual counterbalance valve assemblies (204, 206) are preferably utilized to prevent overrunning or load runaway. So that accurate pressures may be ascertained on each side of the cylinder 202, pair of gauge isolators (208, 210) is preferably employed. The tilting system may be operated from either side of the mule 100. The lift system 300 includes a hydraulic cylinder 302 connected to a velocity fuse 304. The lifting system also preferably includes a pair of pressure compensated flow controllers (306, 308). Like the tilting system, the lifting system may be operated from either side of the mule 100 via a pair of hand pumps (314, 316).

As best illustrated in FIGS. 23-26, the mule 100 may be operably employed with a mechanized storage assembly 102 and a mule guide 170. The mule guide 170 may be a simple mechanical guide system with stop for allowing an operator to readily position the mule 100 in position to receive or unload an auxiliary from/to the mule/storage (100, 102). Likewise, an optical or electromechanical system may also be employed.

In a presently preferred embodiment of the mule of the present invention the cradle 168 may be lowered to within 1.0 inches of the ground. To facilitate the low operating envelope a U-shaped frame is utilized so the cradle 168 is not encumbered in lowest position by frame structure. Additionally, the center of gravity is kept outside of the frame in a low-loaded condition such that the cradle 168 center of gravity is centered within the frame when the cradle is in a high-loaded position.

The mule 100 of the present invention preferably includes lift, tilt, and rotational adjustments (skew). Prior art mules require brute personnel force to shove and/or push an auxiliary into alignment. The mule 100 of the present invention allows an operator to mechanically adjust lift and tilt to the required install/uninstall height/tilt and then rotate or skew the cradle 168 into a fine adjustment. Thus, even side-to-side (rotational skew and pivot) requires less than 50 pounds of force (the lateral floating carriage bearings 194 and bearing guides 196) and may be accomplished without moving the rollable frame 106 of the mule 100.

The mule 100, in a presently preferred embodiment, includes toe operated, regulated-speed, and descent controllers 192 on both sides of the frame. Hydraulic lift pumps are preferably included on both sides of the frame and it is preferred to utilize a higher speed hydraulic lift pump on one side and a lower speed pump on the other side for finer lift adjustments. It is presently preferred to utilize a single reservoir 154 so that both pumps may be operated simultaneously (for highest speed lift).

Figure 21:
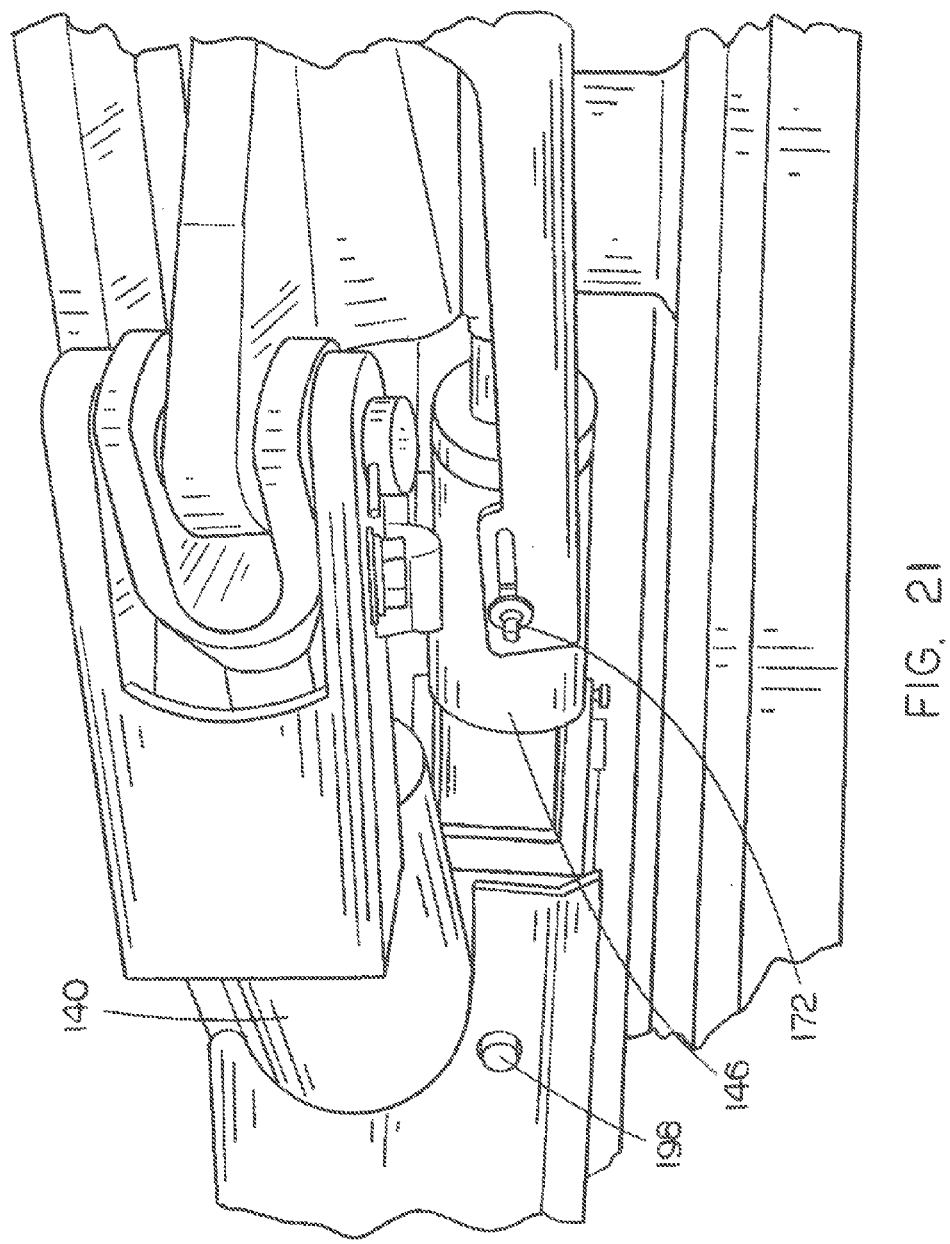
FIG. 21 is a top perspective view illustrating the tilt direction and tilt amount indicator of a presently preferred embodiment of the present invention.
Figure 22:
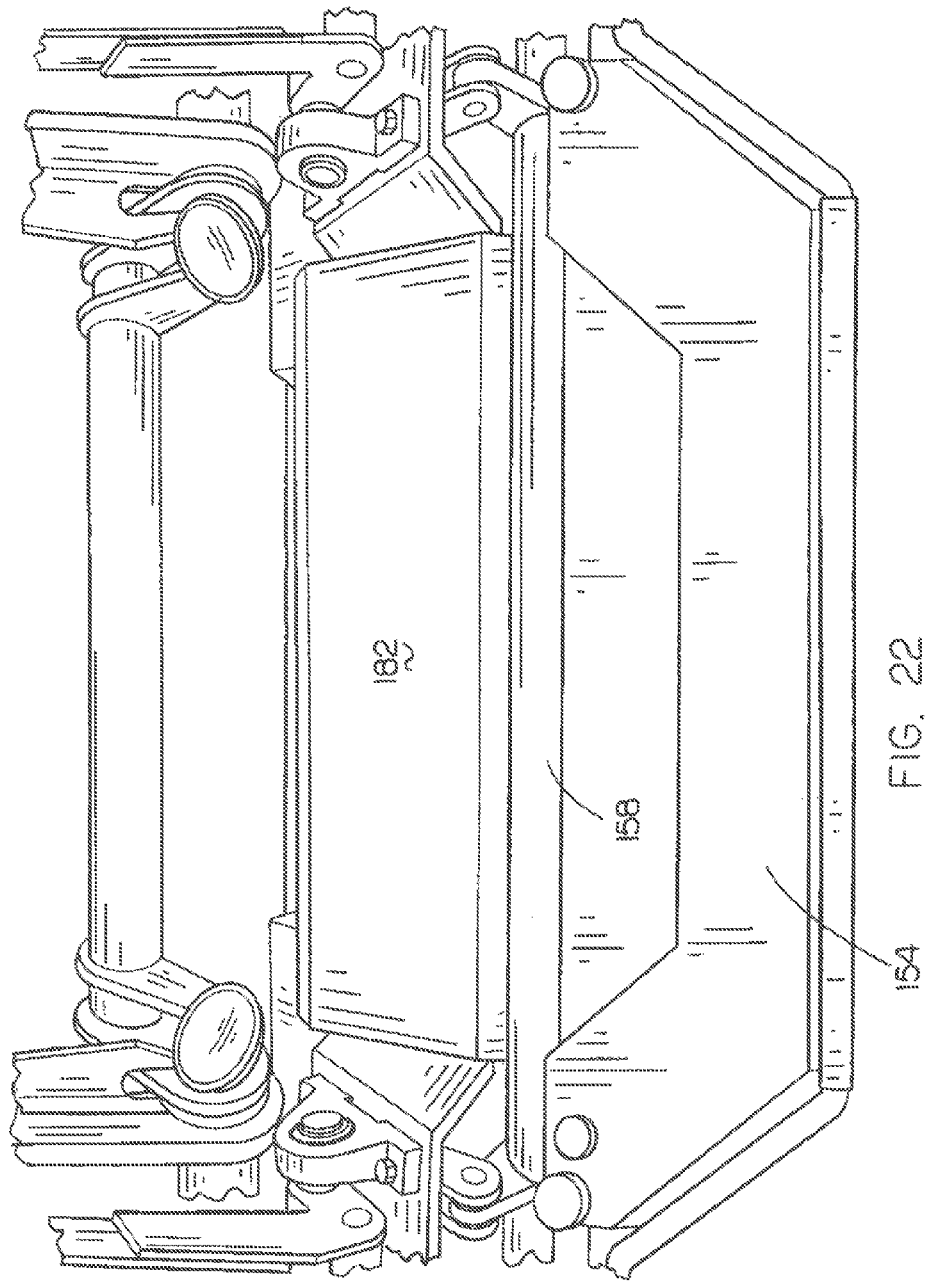
FIG. 22 is a top perspective view of the front of a preferred embodiment illustrating the lift reservoir and the counterbalance.
Figure 23:
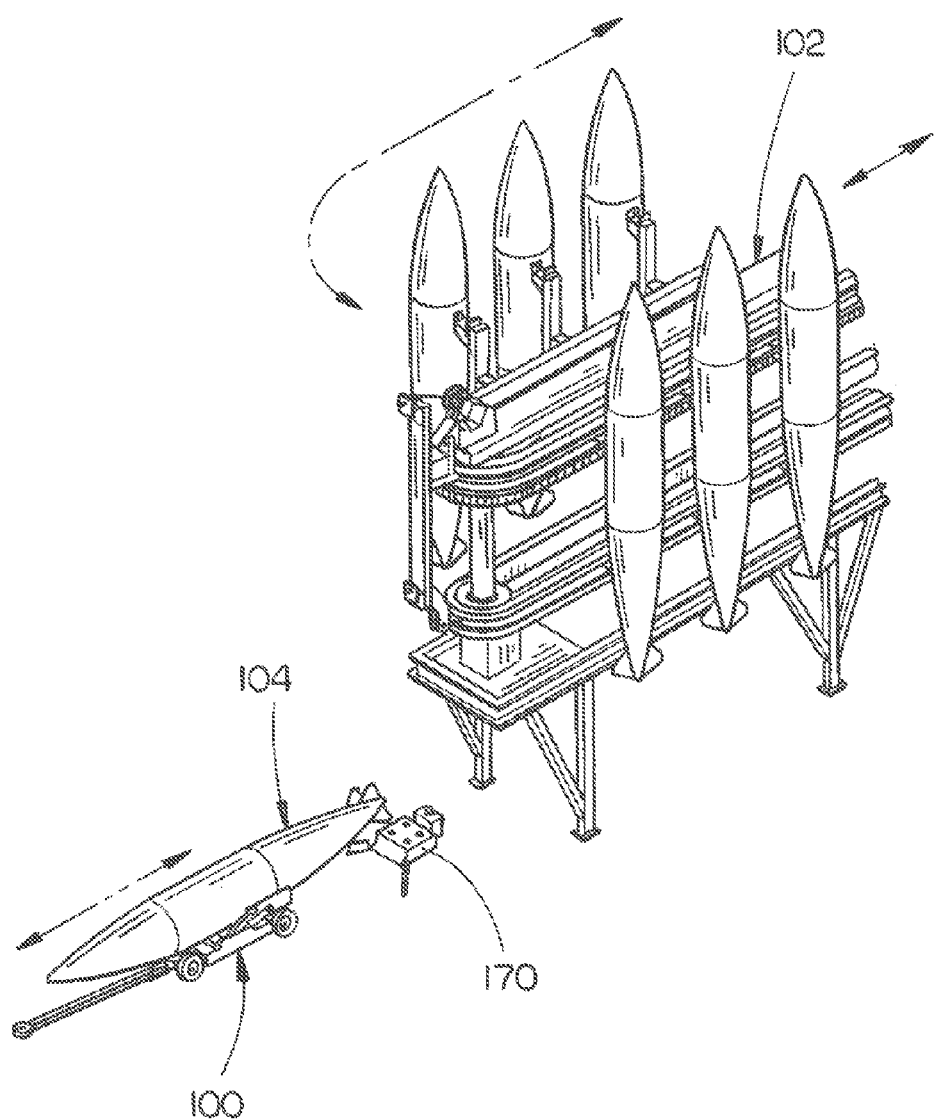
FIG. 23 is a diagrammatic perspective view of the system of the present invention illustrating a universal aircraft mule, auxiliary storage facility and mule guide.
Figure 24:
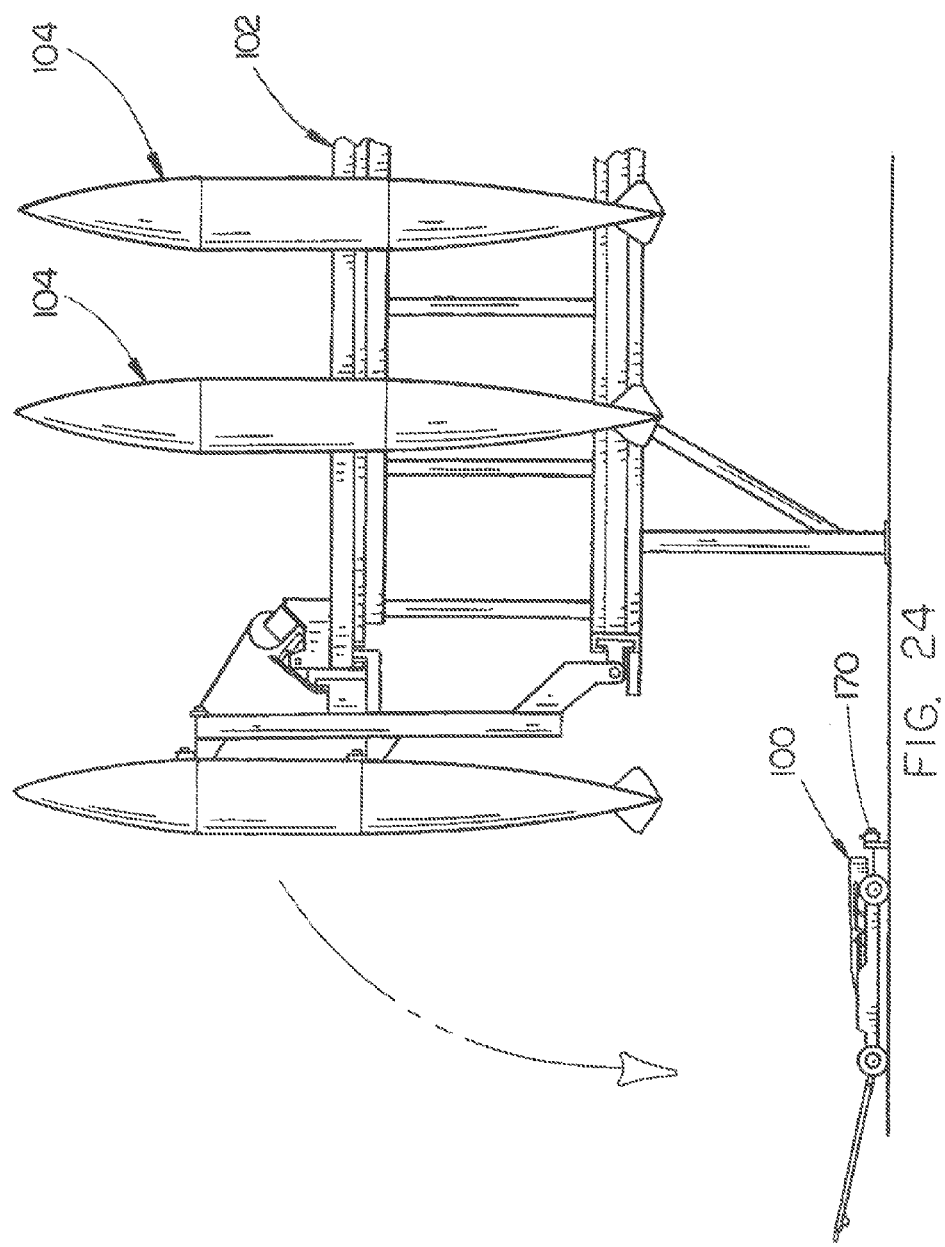
FIG. 24 is a side elevational view of the system of the present invention in a ready to load configuration illustrating the sequential vertical storage facility with auxiliary selection, mule guide and tilt-to-load feature.
Figure 25:
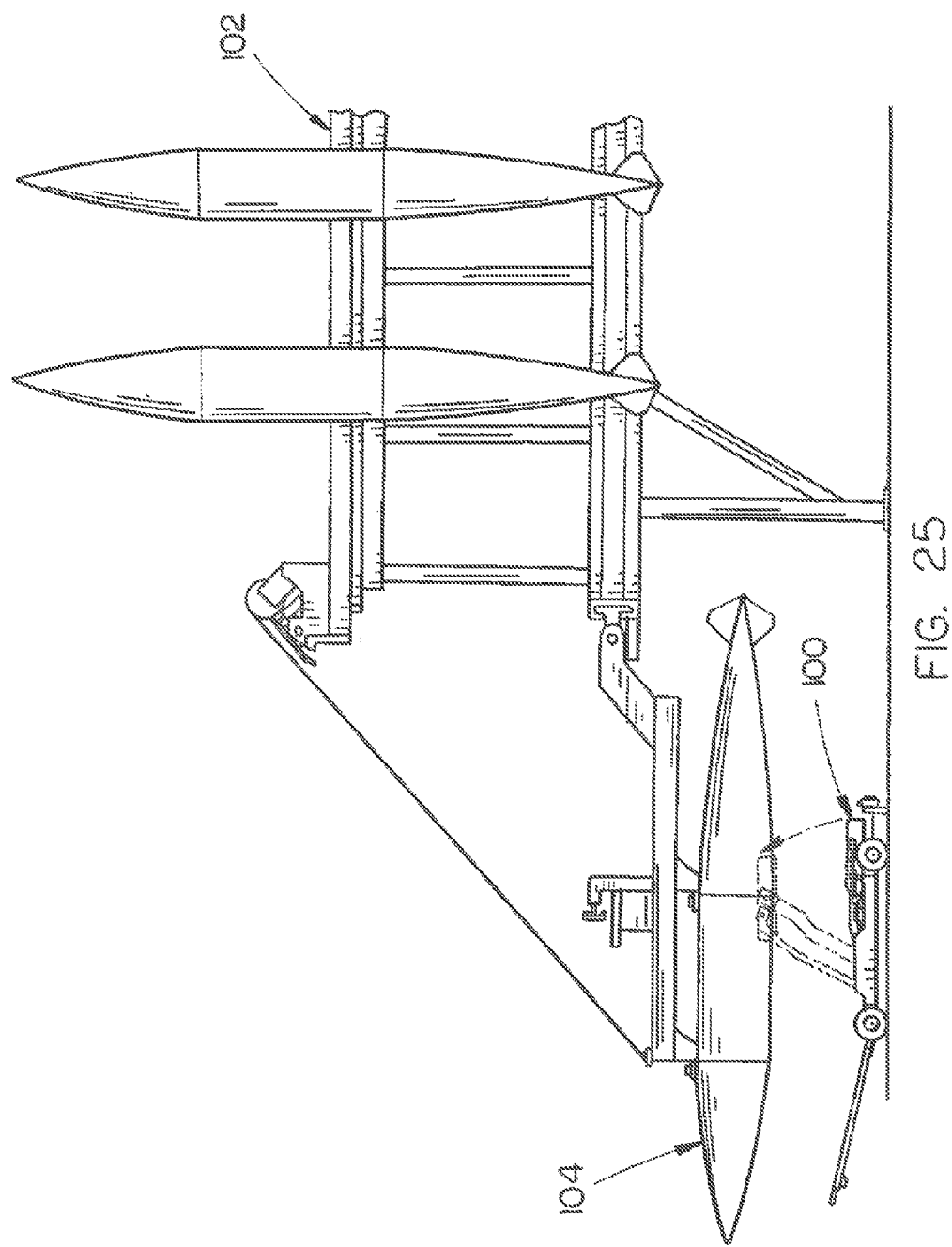
FIG. 25 is a side elevational view of the system of the present invention in a loading position illustrating the sequential vertical storage facility with auxiliary selection, mule guide and tilt-to-load feature.
Figure 26:
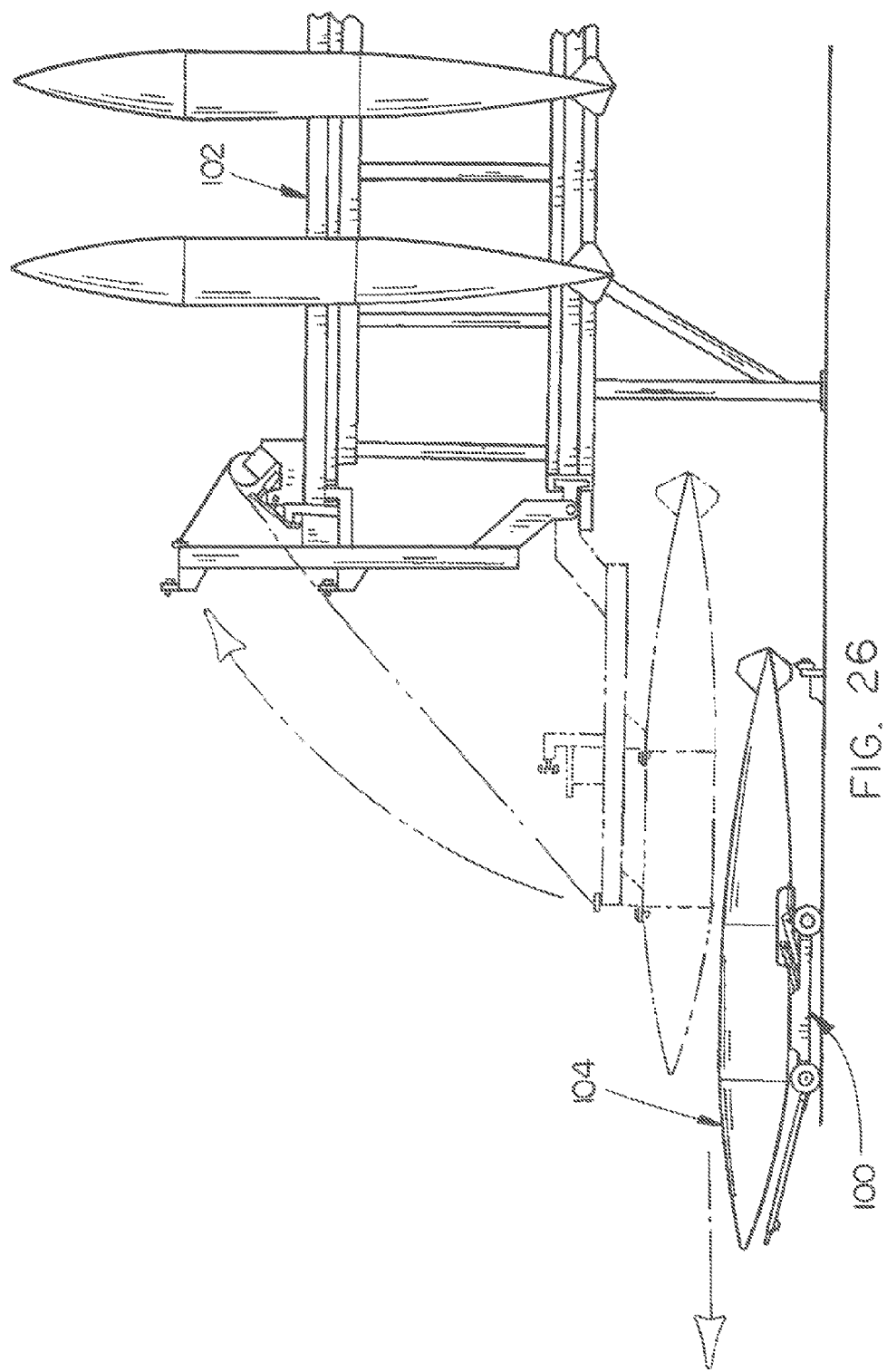
FIG. 26 is a side elevational view of the system of the present invention in a loaded carrying configuration illustrating the sequential vertical storage facility with auxiliary selection, mule guide and tilt-to-load feature.
Figure 27:
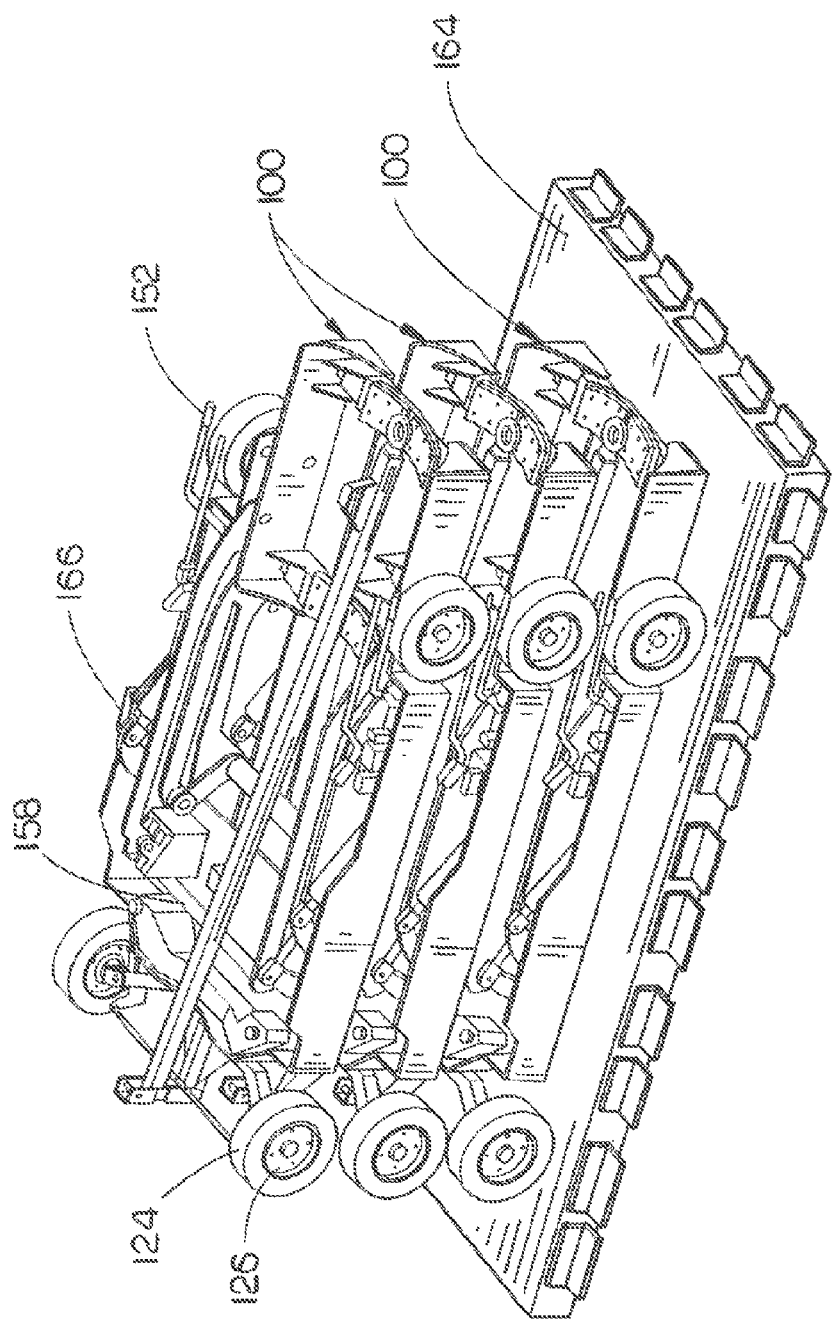
FIG. 27 is a side perspective view of three stacked mules (four may be safely transported) on a 463L pallet.

The mule 100 pump handles are preferably calibrated (and levered) so as to require approximately 50 pounds of force for both lift and tilt. A tilt pressure relief valve 198, is also preferably included, so the tilt pump handles 252, 254 may be lowered or placed at an optimum (location/position) (install/uninstall), for example, lowered stowed location without moving (lifting/tilting) the load. A tilt indicator 172 may also be provided so as to allow personnel to readily pre-adjust a load to the tilt and/or lift height necessary to place the mule 100 into an optimal load/unload position (FIG. 21). All hydraulics are placed and routed in protected areas within the frame. The cradle 168 is easily interchangeable with an alternate cradle for facilitating carriage of any auxiliary having specialized pick-up points.

The mule 100 may further comprise cradle spacer 174, stabilizer slots 176, tilt hydraulic reservoir 180, counter balance 182, strap retention pin 184, cradle spacer lock 186, load recess 188, and tilt direction control 190. Additionally, mule 100 may be configured to be capable of safely lifting, tilting, pivoting, and transporting a load having a weight of 4500 pounds and having a length of 28 feet. Embodiments of mule 100 may include a hydraulic tilt lock for lockably controlling the amount of cradle tilt in a set position and the hydraulic tilt lock is functional under load and at any cradle tilt and height. Additional embodiments of mule 100 may include a torsional load stabilizer and a frame that is hydraulic counter-balanced, the counterbalancing may include an arrangement of said cradle in relation to the rollable frame. Further embodiments of mule 100 may include a height descent rate control for adjustably controlling a rate at which a height of the cradle is allowed to move in a vertical descent. Further, embodiments of mule 100 may include a hydraulic tilt lock for lockably controlling an amount of cradle tilt in a set position. The hydraulic tilt lock may be functional under a load and at any cradle tilt and height.

The invention claimed is:

1. An apparatus, comprising:
   (a) a rollable frame, said rollable frame movably steerable in both a forward direction and an aft direction substantially opposite the forward direction;
   (b) a lift assembly operably attached to said rollable frame;
   (c) a cradle having a first side and a second side and a front and a back, said cradle operably attached to said lift assembly and configured for supporting an auxiliary fuel tank;
   (d) a first user operable hydraulic system for raising and lowering said cradle between a first generally horizontal plane generally in line with a generally horizontal plane occupied by said frame and a second generally horizontal plane parallel to and separate from said generally horizontal plane occupied by said frame, the first user operable hydraulic system drawing hydraulic power from a lift hydraulic reservoir supplying each of: a first lift hand pump and a second lift hand pump; and
   (e) a second user operable hydraulic system for tilting said cradle in an aft up or an aft down direction via extension or retraction of a hydraulic cylinder for adjusting an angle of said cradle in relation to said first and second planes generally parallel to said generally horizontal plane occupied by said frame, the second user operable hydraulic system drawing hydraulic power from a tilt hydraulic reservoir supplying each of: a first hand pump and a second hand pump, the second user operable hydraulic system separate from the first user operable hydraulic system, the second user operable hydraulic system shares no: hydraulic lines, hydraulic fluid, hydraulic cylinders, hydraulic pumps with the first user operable hydraulic system;
   (f) wherein each of a plurality of said apparatus is configured to be stacked along at least a generally vertical axis with another of the apparatus such that, when stacked, longitudinal axes of each of said stacked apparatus are generally parallel and each of the stacked apparatuses is configured to remain within a horizontal planar size boundary of 108 inches by 88 inches upon a shipping pallet.

2. The apparatus of claim 1, further comprising a pivot in operable association with said cradle for pointing an auxiliary fuel tank supported by said cradle in a direction angled in relation to said first and second planes generally parallel to said generally horizontal plane occupied by said frame.

3. The apparatus of claim 2, wherein said frame includes a steering mechanism.

4. The apparatus of claim 3, wherein said steering mechanism includes a pair of wheels and axles, each wheel rotationally coupled with said rollable frame via an axle, and each wheel connected to a steering arm via a tie rod.

5. The apparatus of claim 4, wherein said steering mechanism is attached to said frame on a forward side of said frame and said lift assembly is pivotably attached to said frame generally aft of said pair of wheels.

6. The apparatus of claim 5, wherein said steering mechanism includes a tow bar coupled with said steering arm for one or more of turning, pushing, and pulling said apparatus.

7. The apparatus of claim 6, wherein said tow bar is fabricated from a light-weight material selected from at least one of aluminum and a composite material.

8. The apparatus of claim 1, wherein said lift assembly includes a generally parallelogram-shaped lift linkage.

9. The apparatus of claim 8, wherein said generally parallelogram-shaped lift linkage includes a first hydraulic cylinder pivotably driving an aft port lifting bar and an opposing aft starboard lifting bar, said aft port and opposing aft starboard lifting bars pivotably connected at aft positions to said opposing first and second sides of said cradle, and a second hydraulic cylinder pivotably driving, in an aft up or an aft down direction, in general parallel arrangement to said aft port lifting bar and opposing aft starboard lifting bar, a pair of fore port and fore starboard tilting bars pivotably connected at fore positions to said opposing first and second sides of said cradle.

10. The apparatus of claim 9, further including a transport height locking device.

11. The apparatus of claim 9, wherein said pivotable connections include at least one of bronze and ball bearings.

12. The apparatus of claim 9, wherein said cradle comprises a lateral floating cradle for allowing said cradle to be skewed in a generally horizontal plane.

13. The apparatus of claim 12, further comprising anti-rotation stabilizers for at least substantially preventing a generally cylindrically-shaped load from rotating within said cradle.

14. The apparatus of claim 9, wherein said apparatus is configured to transport at least one of a center tank, a wing tank, or an A-10 tank.

15. The apparatus of claim 1, further comprising a parking brake associated with at least one of said wheels.

16. The apparatus of claim 15, wherein said parking brake includes a spring loaded pin lockingly engagable with a brake plate.

17. The apparatus of claim 16, wherein said rollable frame comprises a non-sparking skid plate.

18. The apparatus of claim 17, wherein said non-sparking skid plate includes one or more composite friction pads for non-sparking engagement with a paved surface supporting the rollable frame, the paved surface including at least one of an asphalt and a concrete surface.

19. The apparatus of claim 1, wherein a plurality of said apparatus are configured to be stacked along at least a generally vertical axis such that the longitudinal axes of said apparatus are generally parallel upon a shipping pallet.

20. The apparatus of claim 1, further comprising a hydraulic control for each of said first and second user operable hydraulic systems for operably controlling cradle height and tilt.

21. The apparatus of claim 20, further comprising dual hydraulic controls such that said first and second user hydraulic systems is controlled from either one of the port and starboard side of said apparatus.

22. The apparatus of claim 20, further comprising a protected centrally-oriented hydraulic reservoir.

23. The apparatus of claim 22, further comprising a fluid level indicator.

24. The apparatus of claim 1, further comprising at least one of an optical, a mechanical, or an electrical positional guidance for facilitating loading and unloading said apparatus from at least one of an aircraft or a storage facility.

25. An apparatus, comprising:
(a) a rollable frame, said rollable frame movably steerable in both a forward direction and an aft direction substantially opposite the forward direction;
(b) a cradle having a port side and a starboard side and fore and aft ends;
(c) a lift assembly operably attached to said rollable frame, said lift assembly including a first hydraulic cylinder operably driven by a first user operable hydraulic system, the first hydraulic cylinder pivotably driving an aft port lifting bar and an opposing aft starboard lifting bar, said aft port and opposing aft starboard lifting bars pivotably connected to said aft ends of said opposing port and starboard sides of said cradle, the first user operable hydraulic system drawing hydraulic power from a lift hydraulic reservoir supplying each of: a first lift hand pump and a second lift hand pump, a second hydraulic cylinder operably driven in extension or retraction by a second user operable hydraulic system, the second hydraulic cylinder pivotably driving, in general parallel arrangement to said aft port lifting bar and opposing aft starboard lifting bar, a pair of fore port and fore starboard tilting bars pivotably connected to said fore ends of said opposing port and starboard sides of said cradle, said second hydraulic cylinder configured to tilt said cradle in an aft up or an aft down direction via extension or retraction of said second hydraulic cylinder, the second user operable hydraulic system drawing hydraulic power from a tilt hydraulic reservoir supplying each of: a first hand pump and a second hand pump, the second user operable hydraulic system separate from the first user operable hydraulic system, the second user operable hydraulic system shares no: hydraulic lines, hydraulic fluid, hydraulic cylinders, hydraulic pumps with the first user operable hydraulic system;
(d) a pivot in operable association with said cradle for pointing an auxiliary fuel tank supported by said cradle in a direction angled in relation to a generally horizontal plane occupied by said rollable frame; and
(e) a steering mechanism having a pair of wheels and axles, each wheel rotationally coupled with said rollable frame via an axle, and each wheel connected to a steering arm via a tie rod, said steering mechanism is attached to said frame, and said lift assembly is pivotably attached to said frame generally aft of said pair of wheels
wherein each of a plurality of said apparatus is configured to be stacked along at least a generally vertical axis with another of the apparatus such that, when stacked, longitudinal axes of each of said stacked apparatus are generally parallel and each of the stacked apparatuses is configured to remain within a horizontal planar size boundary of 108 inches by 88 inches upon a shipping pallet.

26. The apparatus of claim 25, further comprising a parking brake associated with said rollable frame.

27. The apparatus of claim 26, wherein said rollable frame comprises a non-sparking skid plate.

28. The apparatus of claim 26, wherein said non-sparking skid plate includes one or more composite friction pads for non-sparking engagement with a paved surface supporting the rollable frame, the paved surface including at least one of an asphalt and a concrete surface.

29. The apparatus of claim 25, wherein a plurality of said apparatus are configured to be stacked along at least a generally vertical axis such that the longitudinal axes of said apparatus are generally parallel upon a shipping pallet.

30. The apparatus of claim 25, further including a transport height locking device.

31. The apparatus of claim 25, further comprising a hydraulic control for each of said first and second user operable hydraulic systems for operably controlling cradle height and tilt.

32. The apparatus of claim 31, further comprising dual hydraulic controls such that said first and second user hydraulic systems may be controlled from either one of the port and starboard side of said apparatus.

33. The apparatus of claim 25, wherein said apparatus is configured to transport at least one of a center tank, a wing tank, or an A-10 tank.

34. The apparatus of claim 25, further comprising at least one of an optical, a mechanical, or an electrical positional guidance for facilitating loading and unloading said apparatus from at least one of an aircraft or a storage facility.

35. An apparatus, comprising:
(a) a rollable frame, said rollable frame movably steerable in both a forward direction and an aft direction substantially opposite the forward direction;
(b) a cradle having a port side and a starboard side and fore and aft ends;
(c) a lift assembly operably attached to said rollable frame, said lift assembly including a first hydraulic cylinder operably driven by a first user operable hydraulic system, the first hydraulic cylinder pivotably driving an aft port lifting bar and an opposing aft starboard lifting bar, said aft port and opposing aft starboard lifting bars pivotably connected to said aft ends of said opposing port and starboard sides of said cradle, the first user operable hydraulic system drawing hydraulic power from a lift hydraulic reservoir supplying each of: a first lift hand pump and a second lift hand pump, a second hydraulic cylinder operably driven in extension or retraction by a second user operable hydraulic system, the second hydraulic cylinder pivotably driving, in general parallel arrangement to said aft port lifting bar and opposing aft starboard lifting bar, with a pair of fore port and fore starboard tilting bars pivotably connected to said fore ends of said opposing port and starboard sides of said cradle, said second hydraulic cylinder configured to tilt said cradle in an aft up or and aft down direction via extension or retraction of said second hydraulic cylinder, the second user operable hydraulic system drawing hydraulic power from a tilt hydraulic reservoir supplying each of: a first hand pump and a second hand pump, the second user operable hydraulic system separate from the first user operable hydraulic system, the second user operable hydraulic system shares no: hydraulic lines, hydraulic fluid, hydraulic cylinders, hydraulic pumps with the first user operable hydraulic system;

(d) a pivot in operable association with said cradle for pointing an auxiliary fuel tank supported by said cradle in a direction angled in relation to a generally horizontal plane occupied by said rollable frame;

(e) a steering mechanism having a pair of wheels and axles, each wheel rotationally coupled with said rollable frame via an axle, and each wheel connected to a steering arm via a tie rod, said steering mechanism is attached to said frame, and said lift assembly is pivotably attached to said frame generally aft of said pair of wheels; and (f) a tilt indicator for indicating the amount and direction of cradle tilt;

(g) wherein each of a plurality of said apparatus is configured to be stacked along at least a generally vertical axis with another of the apparatus such that, when stacked, longitudinal axes of each of said stacked apparatus are generally parallel and each of the stacked apparatuses is configured to remain within a horizontal planar size boundary of 108 inches by 88 inches upon a shipping pallet.

36. The apparatus of claim 35, wherein up to four of said apparatus in an unloaded configuration are configured to be transported on a 463L pallet.

37. The apparatus of claim 35, wherein said frame is generally U-shaped.

\* \* \* \* \*